(12) United States Patent
Tal et al.

(10) Patent No.: US 12,301,745 B2
(45) Date of Patent: May 13, 2025

(54) HYBRID SMART PHONE SMART CAMERA SYSTEM BASED ON METHODS AND SYSTEM FOR MODIFYING A SMART PHONE

(71) Applicant: Visual Defence Inc., Richmond Hill (CA)

(72) Inventors: Royi Tal, Richmond Hill (CA); Suthakaran Kandasamy, Richmond Hill (CA); Thomas Bakonyi, Richmond Hill (CA); Omri Artman, Richmond Hill (CA); Redenthor Ibana, Richmond Hill (CA); David Curry, Richmond Hill (CA)

(73) Assignee: Visual Defence Inc., Richmond Hill (CA)

( * ) Notice: Subject to any disclaimer, the term of this patent is extended or adjusted under 35 U.S.C. 154(b) by 58 days.

(21) Appl. No.: 17/534,816

(22) Filed: Nov. 24, 2021

(65) Prior Publication Data
US 2023/0164254 A1   May 25, 2023

(51) Int. Cl.
*H04M 1/02* (2006.01)
*G06F 1/20* (2006.01)
*G06F 1/26* (2006.01)
*H04M 1/72409* (2021.01)

(52) U.S. Cl.
CPC .......... *H04M 1/0277* (2013.01); *G06F 1/203* (2013.01); *G06F 1/263* (2013.01); *H04M 1/0262* (2013.01); *H04M 1/0264* (2013.01); *H04M 1/724092* (2022.02)

(58) Field of Classification Search
CPC ............. H04M 1/0277; H04M 1/0262; H04M 1/0264; H04M 1/724092; H04M 1/72403; H04M 1/0254; H04M 1/724098; H04M 2250/52; G06F 1/203; G06F 1/263; G06F 1/26; H05K 7/20136
See application file for complete search history.

(56) References Cited

U.S. PATENT DOCUMENTS

| | | | | |
|---|---|---|---|---|
| 6,532,152 B1* | 3/2003 | White | ............... | G02F 1/133308 |
| | | | | 312/223.1 |
| 10,068,619 B1* | 9/2018 | Chew | ................. | H04M 1/72409 |
| 2004/0001359 A1* | 1/2004 | Ott | ......................... | G11C 5/143 |
| | | | | 365/185.18 |
| 2010/0323657 A1* | 12/2010 | Barnard | ................ | H04W 4/029 |
| | | | | 455/410 |

(Continued)

FOREIGN PATENT DOCUMENTS

EP    3618012 A1 *   3/2020   ............. G07C 5/008

*Primary Examiner* — Angelica Perez
(74) *Attorney, Agent, or Firm* — Procopio, Cory Hargreaves & Savitch LLP

(57) ABSTRACT

System and methods for adapting a smart phone for use as a hybrid smart phone and smart camera, referred to as a modified or hybrid device. The modified device is based on a set of smart phone components which has its battery removed and is instead powered by alternative circuitry. The modified device is also outfitted with a variety of modifications which allow it to operate in an extended temperature range. The modified device is loaded with software and circuitry which allow it to operate automatically without human interaction. The modified device functions as a smart camera but includes beneficial smart phone functions and features.

19 Claims, 11 Drawing Sheets

(56) References Cited

U.S. PATENT DOCUMENTS

| | | | | |
|---|---|---|---|---|
| 2014/0006807 | A1* | 1/2014 | Oglesby | G06F 1/263 |
| | | | | 713/300 |
| 2014/0321058 | A1* | 10/2014 | Fujieda | F28D 15/0233 |
| | | | | 29/890.032 |
| 2015/0326702 | A1* | 11/2015 | Ames | H04B 1/3833 |
| | | | | 455/556.1 |
| 2018/0150118 | A1* | 5/2018 | Kalam | G06F 1/266 |
| 2018/0284851 | A1* | 10/2018 | Seidemann | H01L 23/3737 |
| 2019/0346893 | A1* | 11/2019 | Dillow | G06F 1/1626 |
| 2020/0029467 | A1* | 1/2020 | Chang | G06F 1/203 |
| 2020/0121190 | A1* | 4/2020 | Whitehead | G16H 30/40 |
| 2023/0164254 | A1* | 5/2023 | Tal | H04M 1/72403 |
| | | | | 455/575.1 |

* cited by examiner

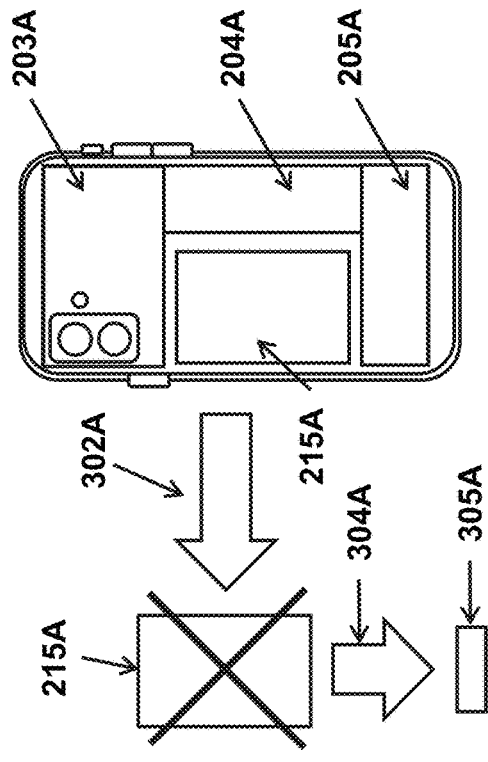
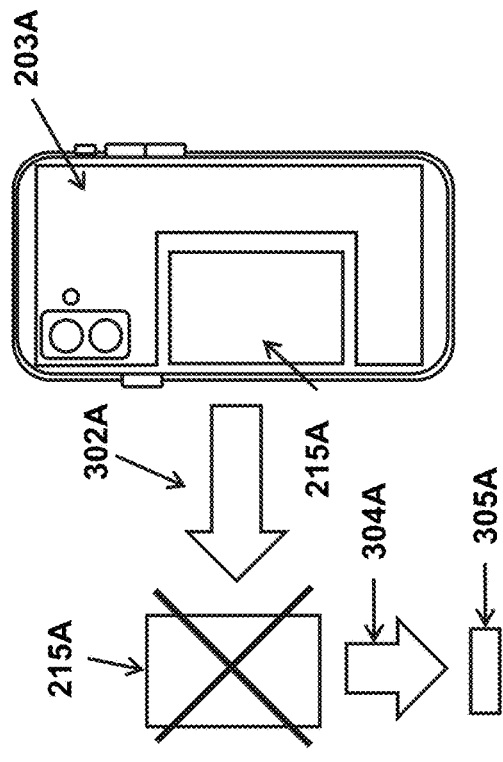
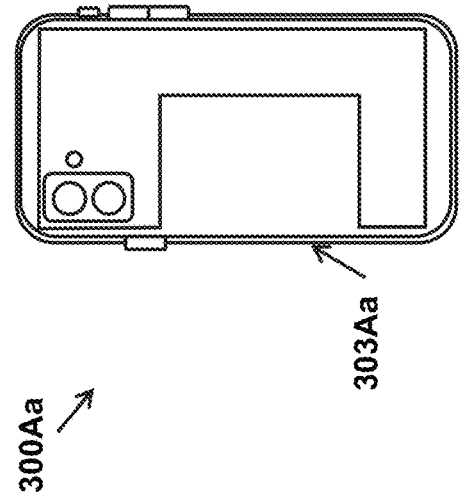
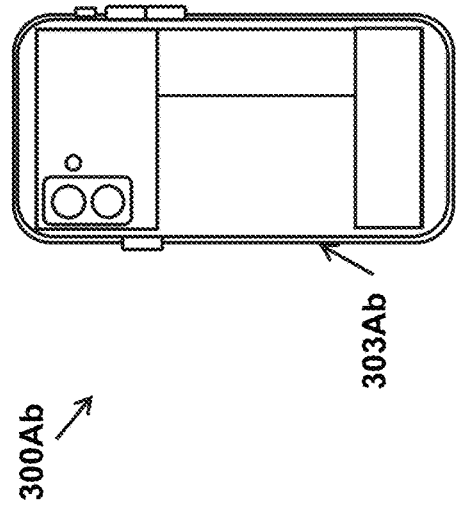
Figure 3A
Figure 3B

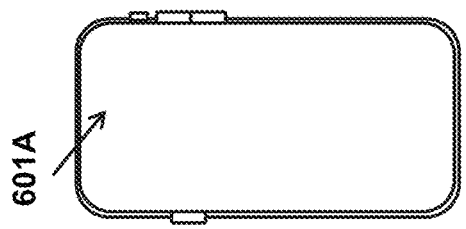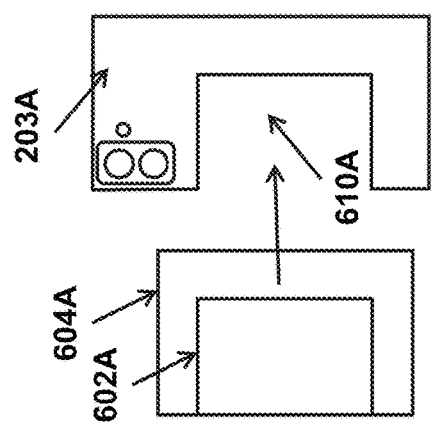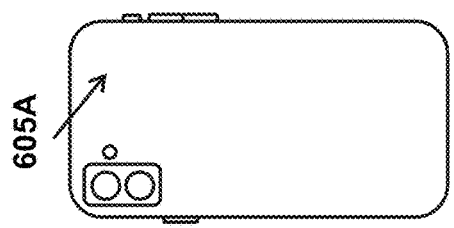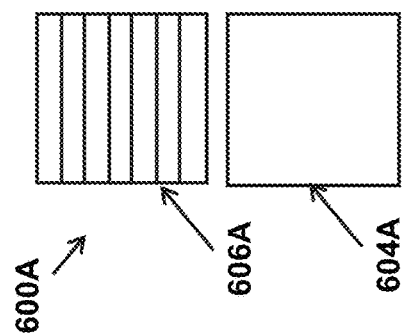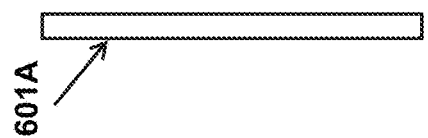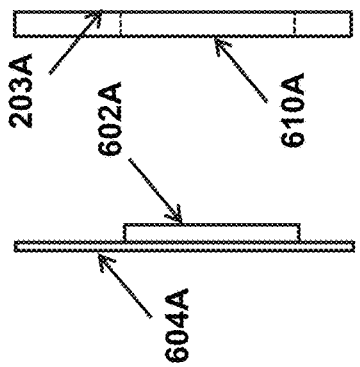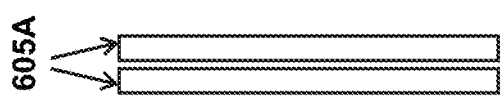

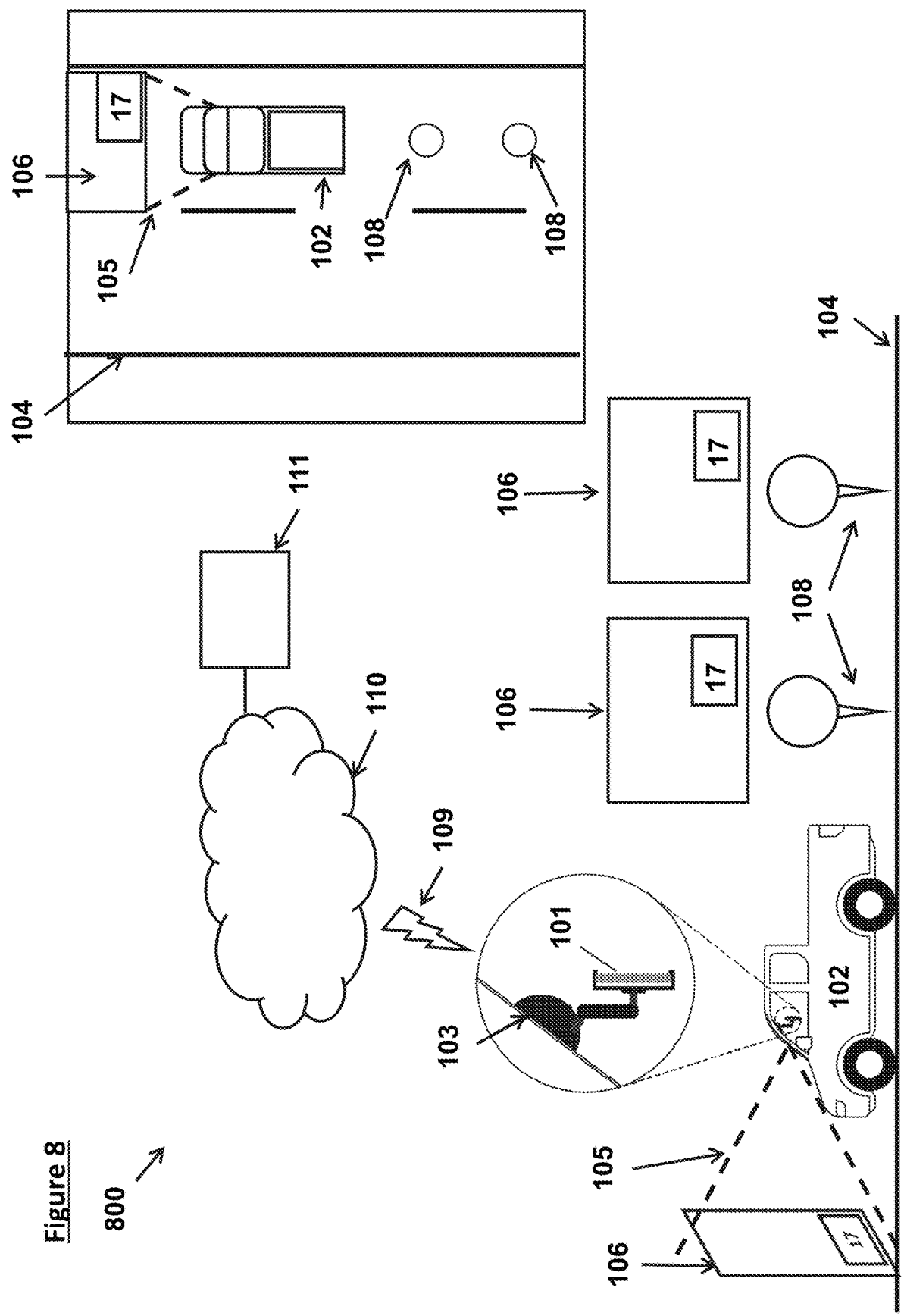

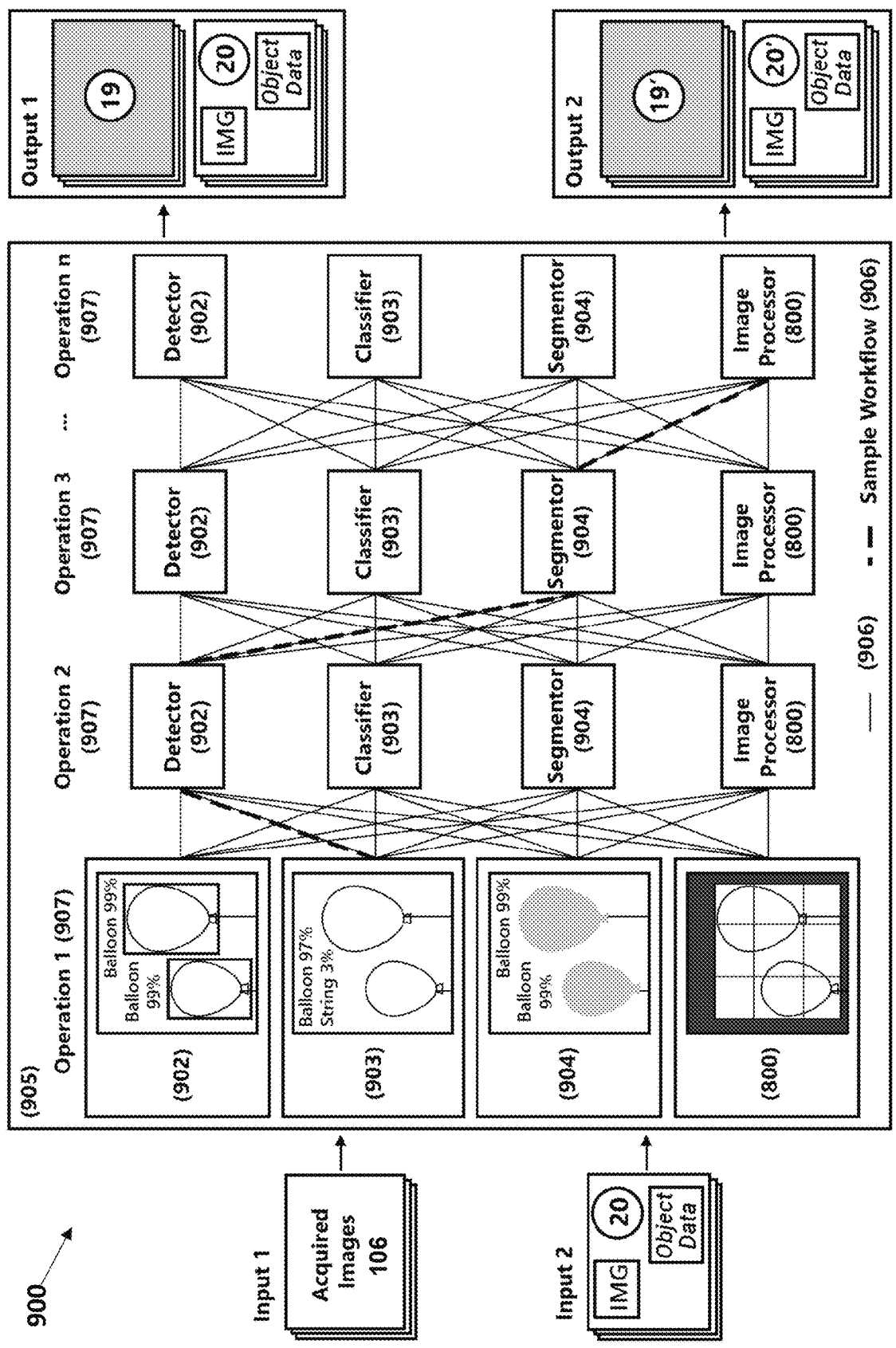

HYBRID SMART PHONE SMART CAMERA SYSTEM BASED ON METHODS AND SYSTEM FOR MODIFYING A SMART PHONE

FIELD

The present invention is related to a smart phone modified to perform hybrid functions as a smart phone and a smart camera system.

BACKGROUND

Smart phones (and tablets) are powerful embedded devices, which come typically with a variety of camera options, processors (such as GPUs and CPUs), multiple communication methods (such as Bluetooth, Wi-fi, cellular), location based sensors (such as GPS or GNSS), microphone, speakers, touchscreen and a variety of other sensors (such as magnetic, gyroscope, accelerometer) and other state of the art technological components and capabilities.

Smart phones are manufactured by a variety of major corporations and typically come with various options which reflect different hardware configurations at different price points. For greater clarity, the terms "smart phones" and "tablets" will be used interchangeably for the purpose of describing the invention.

In many ways, smart phones are powerful computers, and as such, considering the breadth of suppliers, the wide availability, the mass production, the different hardware options, and the powerful capabilities, smart phones are a popular hardware choice for a variety of computing applications which go beyond personal use cases. Today, smart phones are used for different business needs. This is typically done by loading the smart phone with a specialized software, commonly referred to as an app. Some examples of use cases include (a) smart phones/tablets used for payment processing in stores; (b) scanning QR codes and barcodes for inventory management; (c) business communications (chats, video calls and VOIP); (d) dispatching and work order management (i.e. deliveries, incident management) and many other different applications.

Within vehicles, smart phones may be operated by a person for a variety of applications beyond voice communications. Smart phones may be used for managing deliveries, filling in digital forms, step-by-step navigation, taxis and fares (ridership apps), or as dash-cam apps, amongst other possible applications.

Vehicles are also increasingly being outfitted with smart cameras or Artificial Intelligence (AI) cameras—an informal language used to describe a device which collects image or video footage and processes it using image processing and/or artificial intelligence on the device, on a cloud, or both. AI cameras include cameras which check for incidents or monitor information inside or outside a vehicle.

Some examples of AI cameras functions may include checking driving habits (swerving in and out of lanes), distracted driving (for example, gaze direction of a person a vehicle), driver tiredness (by analyzing the eyes of the driver), use of seatbelts, and a variety of other conditions related to the driving habits of an individual.

The smart cameras may be outfitted with additional sensors, such as GPS/GNSS, accelerometer, gyroscope, light, magnetic field, fingerprint and other sensors, which allow to collect a variety of different information—visually through the camera images or non-visually through analyzing the data acquired by the auxiliary sensors, and report this information in a meaningful way to a responsible party. For example, a distracted truck driver may be reported by a camera to the trucking company, which would receive video footage of the driver typing onto a phone while driving, as well as the GPS coordinates and driving speed at the time of the incident which help to demonstrate the vehicle was in movement when the infraction had occurred. The smart cameras may also look for an assortment of deficiencies and incidents of interest outside of the vehicle related to roads (such as cracks, potholes, and other road issues), asset issues (such as sign, traffic light, street light, or manhole issues), and for surveying a road and collecting data, amongst other applications of interest.

Building smart cameras poses unique challenges. Several processing chip manufacturers (such as Nvidia, Qualcomm, Intel, and others) offer specialized chipsets which are capable of performing highly-parallel computations required for artificial intelligence operations. Embedded board manufacturers then typically embed those chipsets onto specialized computing boards, which are manufactured as single board computer, or as a module (for example, computer card) together with additional components such as memory, processors and microcontrollers. Those boards then have to be integrated with peripherals (such as cameras, communication interfaces, sensors), and packaged to create a smart camera.

The smart cameras then have to be loaded with specialized software which is compatible with all of the components used. The process may involve a fairly complex supply-chain and extensive compatibility tests, and as such, AI cameras may not be readily available or easily designed. Many smart cameras also typically lag behind "the state of the art" artificial intelligence capabilities available on computer video cards or smart phones.

In contrast, smart phones models are sold by the millions and at a consumer affordable price. Due to fierce competition, smart phones typically utilize state of the art components related to artificial intelligence, imaging and sensors, and newer models become available on a regular basis. When loaded with specialized software, smart phones can behave in a manner similar to that of smart cameras.

One area of interest is using smart phones loaded with specialized software, or smart cameras, for the purpose of automatically identifying incidents on a roadway. It is a new and exciting field, in which cameras using AI automatically identify a variety of deficiencies on the road which require attention by a responsible party (typically a local government, operator, or owner). Some examples of incidents of interest include detection of potholes, cracks, road deformation, faded lane markings, trees, signage issues (such as broken, faded, leaning, vandalized, obstructed), clogged catch basins, manhole problems (such as sunken, raised, opened), amongst many other issues visible in the field of view of a vehicle travelling on a road which require action or repairs.

Smart phones make an ideal AI sensor for road issue detection because of the processing capabilities, the integrated sensors, the availability and the cost. Some organizations use the smart phone as a data collection device, recording video or images and sensor data and sending them to the cloud. However, there are also demonstrated use cases in which various organizations loaded a specialized AI app into a smart phone to accomplish automated detection of incidents or data using AI in the smart phone.

Although from computing perspective smart phones provide amazing capabilities at an incredible price points, the devices have their own shortcomings in a vehicle AI camera applications, including (a) heat issues; (b) power issues; (c) cold-start issues; and (d) operation issues.

Touching on power issues and overheating: smart phones pack a lot of sensors and computing power into a small footprint, which creates an environment that could result in potential overheating. In addition, when smart phones perform computationally intensive processes for an extended period of time, such as (a) decoding video from the camera; (b) performing image processing and/or artificial intelligence operations; (c) utilizing internal sensors (such as position, orientation and location sensors; (d) displaying information on a screen; and/or (e) communicating wirelessly (such as cellular connection), the phone is therefore drawing and using a lot of power. In addition, in a vehicle smart camera/dash cam application, when a smart phone is placed in the windshield, it may be placed in a direct sunlight which may further heat up the device. It may also be left in a vehicle without appropriate air-conditioning at temperatures that may exceed its operating temperatures.

Most modern smart phones are powered by a battery (typically a lithium ion battery). Because most smart phone devices operate on battery power, the charging circuit design typically prioritizes charging the battery. As such, in many cases, the direct power source of the device is the battery. This means that the smart phone's computing circuitry may not be directly connected to the power input. Under heavy electrical load, the power draw from the battery may exceed the smart phone's charging capacity, resulting in a voltage drop (and battery drain) over time. As the battery voltage drops down, two issues may occur: (1) the battery's charge may drop to a level which would be insufficient to power the device, resulting an unexpected shutdown; and/or (2), the device itself would draw more current in order to charge the battery. Contributing to the heating issue, the charging process also generates additional heat for the device, which may generate progressively more heat as the battery level depletes.

The smart phones may also have certain hardware and/or software measures meant to protect its electrical components. The components may include thermostat and/or temperature sensors. When the internal components reach certain temperatures, some protective measures may take place. The smart phone may also have internal sensors which are meant to monitor temperature of certain components. For example, under heavy load, when a smart phone generates more heat than it can dissipate, and a lithium battery reaches a certain temperature, the battery may be automatically disconnected from the internal charging circuit. In that case, the smart phone may shut down when the battery temperature reaches a critical level unless the battery temperature is reduced. The smart phone, and/or its components, may also shutdown if the device's GPU or CPU reach a certain temperature.

When a smart phone is used in a dash camera application, it may also be left in a vehicle for an extended (or indefinite) period of time. This means that in very cold weather, when left in the vehicle, and the temperatures drop below a certain level (typically, 0 degrees Celsius or 32 degrees Fahrenheit), the device may reach the same temperature. Depending on the device's battery type and hardware, certain charging functions may be disabled for safety in cold temperatures. The device's holding battery charge and voltage may also be affected by temperature, as also the battery life cycle. The result is that smart phone devices may not be able to be powered on until they reach a specific operating temperature. Some batteries may also be damaged after exposure to extreme heat or cold temperatures.

The need for a person to operate the device poses many challenges. The process is error prone and the person may forget to take one of the steps which may result in the device not being in use. Due to the need to touch the smart phone each time the app is loaded, the person may also accidently change the field of view of the camera by touching the device. The person may also require specialized training to operate the device, which may pose challenge in certain work environments.

Finally, using a smart phone as a dash camera may result in a security issue, whereas a smart phone visible on a windshield may pose an opportunity for potential burglars to break into the vehicle and steal the device.

SUMMARY

It is understood that in contrasting a smart camera/dashcam function to a smart phone function, the expectation is that a smart camera be deployed in a vehicle on a permanent basis, and operate autonomously. This means that when a vehicle is powered on, the smart camera should be powered on its own as well and start performing its intended smart camera functions. Smart phones, in contrast, require several conditions and steps in order to function as a smart camera, which may include some or all of the following conditions: (a) the device or its parts needs to be at an appropriate operating temperature; (b) the device battery needs to be sufficiently charged for the smart phone to boot up (if it is isn't, the device needs to be charged first); (c) the device needs to be manually powered on by a human operator by activating the power button on the phone; and/or (d) the human operator needs to select the appropriate app and launch it.

It is an object of the present invention to provide a method or system to perform electrical and/or mechanical adaptations to a smart phone to obviate or mitigate at least one of the above presented disadvantages, including issues such as but not limited to: (a) heat issues; (b) power issues; (c) cold-start issues; and/or (d) operation issues.

It is an object of the present invention to effectively transform the smart phone to a hybrid smart phone/smart camera system.

One aspect provided is a hybrid smart phone smart camera system that is based on modifications to a smart phone's electrical, mechanical, software and material composition. The hybrid smart phone smart camera system provides a modified smart phone device to be used in a manner, which provides it to operate autonomously, and under various environmental conditions within a vehicle environment. The modified smart phone, which can be operated as a smart camera, may then autonomously analyze images using computer vision and/or artificial intelligence, collect data and transmit it to a remote server. The modified smart phone may retain some of its smart phone functions.

A further aspect provided is a modified device as a system for collecting digital images, the system comprising: a housing; a set of smart phone device components in the housing including a memory and computer processor for executing a set of instructions stored on the memory; a camera controlled by the computer processor, the camera for use in said collecting digital images; and an application as part of the set of instructions stored in the memory, the application when executed by the computer processor implementing said collecting digital images and subsequent processing of the digital images.

A further aspect provided is wherein a battery of a set of smart phone device components is absent from an interior of the housing of the modified device, thereby providing a battery void.

A further aspect provided is a custom power circuit in a housing of the modified device, the custom power circuit replacing the battery by connecting at least some of the set of smart phone device components to a power supply positioned external to the housing.

BRIEF DESCRIPTION OF THE DRAWINGS

Exemplary embodiments of the invention will now be described in conjunction with the following drawings, by way of example only, in which:

FIGS. 3A-3B depict different processes for removal of a smart phone battery, using several configurations of the smart phone of FIG. 1.

FIGS. 6A-6B depicts top and side views of thermal-mechanical modifications for the modified device of FIGS. 4A-4B.

FIG. 8 depicts the modified device of FIGS. 4A-4B used in a vehicle collecting, analyzing and transmitting data.

FIG. 11 depicts a sample image analysis workflow using neural networks and image processing operations of the modified device of FIGS. 4A-4B.

DETAILED DESCRIPTION

Embodiments of the invention can include the features of a smart phone, or a smart camera, and/or a series of steps and methods which allow a standard off the shelf smart phone device to also operate as a smart camera.

Figure 1:
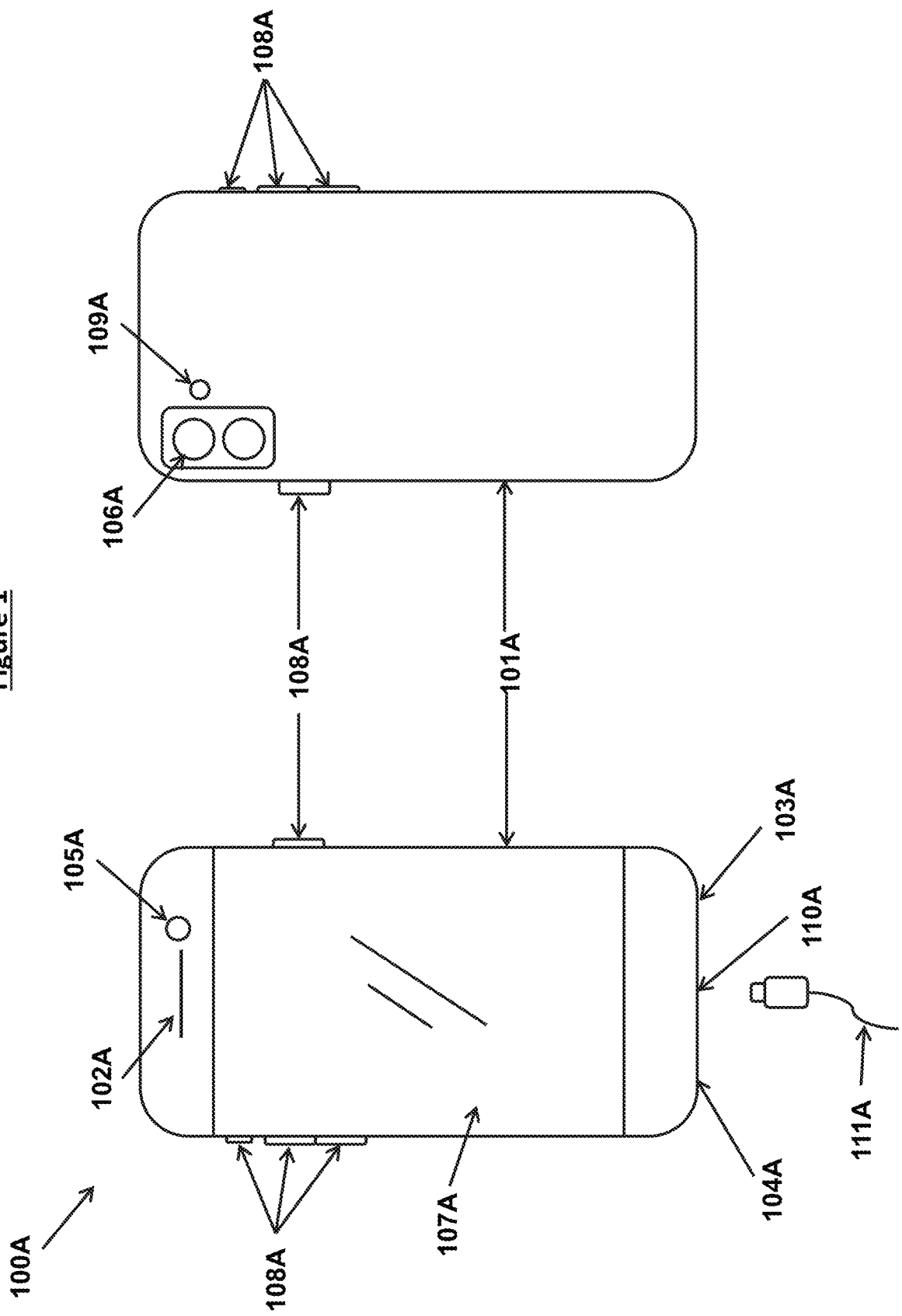
FIG. 1 depicts an example of a smart phone including smart phone components.

Referring to FIG. 1, we show an example 100A of a smart phone 101A exterior from the front and back. This is just an example, and by no means is meant to illustrate all of the different configurations of a smart phone 101A device, but rather depict what a smart phone 101A may look like in order to further describe embodiments of the invention.

The smart phone 101A may include various smart phone components, some of which will be retained in the modified device 101 (see FIGS. 4a,b) as a retained set of smart phone components.

For the purpose of describing what a smart phone 101A is, some components will be mentioned. Some may relate to the embodiments of invention and others may not. A smart phone 101A may or may not include some of the mentioned components. A smart phone 101A typically includes an earpiece speaker 102A, and it may also include loud speakers 103A. The phone 101A will typically include a microphone 104A component which facilitates the smart phone 101A to acquire and digitize sounds. Smart phones 101A typically also include one or more camera(s). The cameras can be front facing camera(s) 105A or rear facing camera(s) 106A. The smart phone (e.g. device) 101A can also include on the front or the back one or more illumination 109A component(s), whether using flash light or infrared illumination. The smart phone may also include a variety of buttons 108A. The smart phone buttons 108A may be on the left side, the right side, the top, the bottom, the front or the back of the device 101A. The buttons 108A can be used for a variety of different functions, including: (a) powering on or off; (b) controlling the volume; (c) muting sound; (d) locking/unlocking screen rotation; (e) initiating emergency call, and other functions. The buttons 108A may be operated in different ways, related to activation duration, number of activations within a timeframe, and may be power sensing, latching, sliding, or momentary push style. The buttons 108A may be programmable or have a fixed function. The smart phone 101A may also include a display 107A for displaying smart phone software based information visually. The display 107A may be touch screen based facilitating the operator to control software functions displayed on the display 107A using a contact with the screen. The smart phone 101A can include a charging port 110A which allows connection of the smart phone 101A to a power source through a charging cable 111A with an appropriate plug head. Some smart phones 101A can also be charged wirelessly, and it may be that in the future there will be smart phones 101A which would be charged exclusively wirelessly, reducing the need for the charging port 110A. The smart phones 101A can include additional components to that provided above or exclude some of the existing components provided above, depending on the manufacturer and model of the smart phone 101A.

Figure 9:
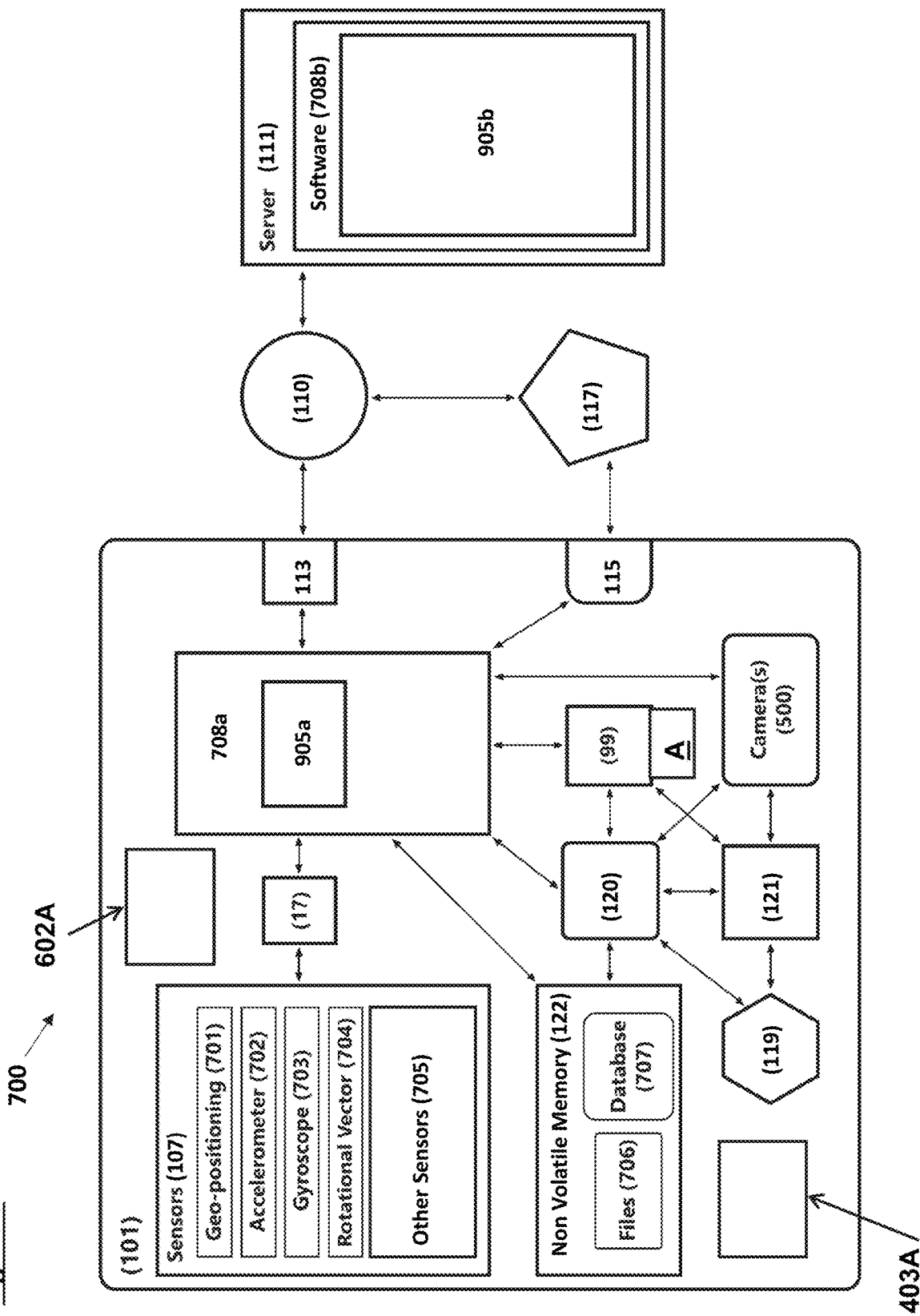
FIG. 9 depicts a sample architecture of the modified device of FIGS. 4A-4B and some typical components of the system including the set of smart phone components.

The smart phone 101A may utilize artificial intelligence software, stored in the device memory 99 (see FIG. 9). Artificial Intelligence software means a software that is capable to utilize image processing functions, and/or utilization of neural networks to analyze images and identify, classify and label objects or regions in the image. The software may do so utilizing neural networks and/or deep learning models which are trained on annotated image datasets and are able, given an image, to infer an image and identify information present within an image. For example, the camera 105A, 106A can identify people, cars, trees, road deficiencies, signs, and other objects of interest. The software can process images acquired by the smart phone's camera(s) 105A, 106A through its AI software, and generate, in addition to the image(s), additional data such as bounding boxes, polygons, masks, labels, landmarks/keypoints and other image descriptive data.

For greater clarity: (a) Bounding boxes typically mean a set of image coordinates representing x,y position within an image which can be used to construct a rectangle (or other bounding shape) encompassing an object of interest present in the image; (b) Polygon typically mean a set of image coordinates representing x,y position within an image which can be used to construct a polygon (or other bounding shape) encompassing an object of interest present in the image; (c) Masks means an overlapping image whereas the pixel values of a background are of a set value, and the pixel values of a detected object in the image are of a different value; There may be multiple mask images, one for each type of object, one for each instance of an object, or one mask for all objects; (d) landmarks or key points represent one or more points of interest within an object, for example, the positions of a person's eye in a face; and (e) labels can be applied to whole images or objects, and represent a unique number, or a text representing the object (for example, "person").

The results (processing of the acquired images from the camera 105A, 106A—of the set of smart phone components) returned by the artificial intelligence also typically include a list of objects or classes, and confidence scores, whereas a confidence score is typically a value between 0 to 1 or 0 to 100 A representing the AI model's confidence in its prediction. The software can automatically identify objects or incidents of interest, collect the appropriate data, digitize it, store it, and/or transmit it.

Figure 2:
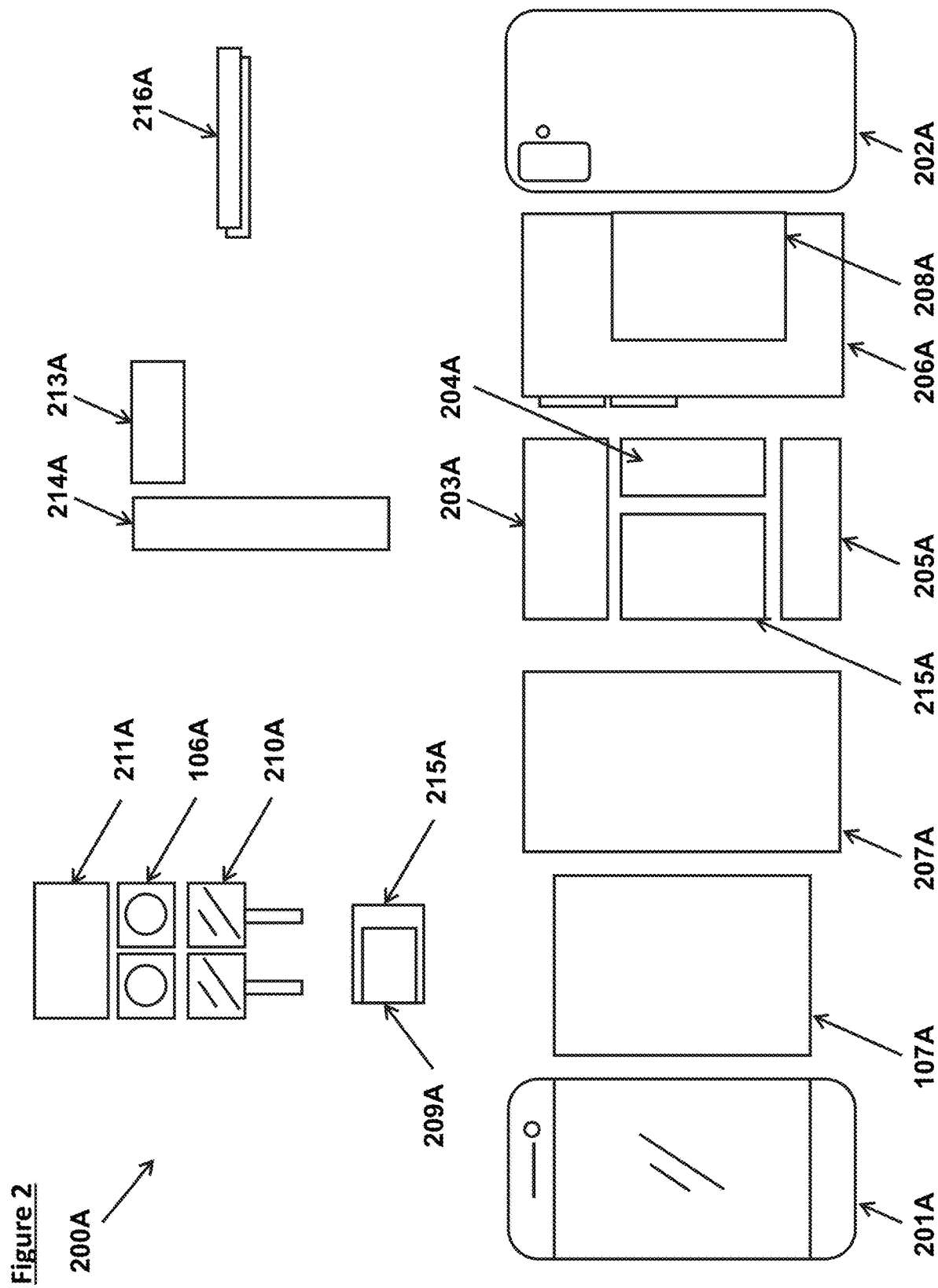
FIG. 2 depicts an example of parts in the interior of a further embodiment of the smart phone of FIG. 1.

Referring to FIG. 2, we will describe by way of an example some typical components of a smart phone 200A. The list itself is not comprehensive and additional parts may present or some of the parts may be missing depending on the configuration of the smart phone 101A. The embodiments of the invention themselves is not considered a smart phone, but rather the results of the modifications to the smart phone 101A, which are described at a later point in this description of the embodiments.

Many smart phones 101A are housed in a shell. The shell may include a front plate 201A and a back plate 202A. The set of smart phone components can also include a touch screen display 107A on the front plate 201A, the back plate 202A or both and includes a motherboard 203A. The motherboard 203A includes the majority of the computing capabilities of the smart phone 101A, including the central processing unit (cpu), graphics processing units (gpu), volatile and non-volatile memory, and other components which derive benefit from high speed interface to the motherboard 203A. Depending on the configuration of the smart phone 101A, the motherboard 203A can house all of the electrical components of the device 101A or can include additional interface(s) 204A that may connect the motherboard 203A to additional daughterboard(s) 205A. For example, the smart phone 101A bottom part can have a charger port 110A, speakers 103A and microphone 104A which may be housed on a daughterboard 205A, as part of the set of smart phone components. Smart phone 101A components can also be housed in a housing/assembly 206A or midframe 207A. For example, wireless charging interface 208A, antenna(s) 216A, earpiece speaker(s) 102A, button(s) 108A, NFC or other components may be housed within components of the smart phone 101A such as assemblies or frames. Other examples of assemblies within the smart phone 101A may include a Subscriber Identity Module (SIM) assembly 215A which allows for docking a SIM card 209A and connecting it to the device's 101A modem. The smart phone camera(s), for example rear camera(s) 106A, may be packaged together with their sensor(s) 210A into a camera assembly unit 211A which houses the cameras 106A in proximity to the motherboard 203A. An assembly model 211A may also be used for the front camera(s) 105A.

The smart phone 101A can also include thermally conductive heat pipe(s) 214A and heat plates (213A), coupled to one or more of the plates 201A, 202A and/or assemblies 206A or mid frames 207A, to conduct heat away from components which generate heat, or are otherwise sensitive to heat, to areas which facilitate the heat to dissipate effectively. Smart phones 101A also include a battery 215A. The battery 215A is typically a Lithium Ion, which allows for faster charging, holds higher power density/capacity, and provides for a longer duration before requiring additional charging.

In view of the above, it is recognised that one of the points of failure of a smart phone 101A, when also functioning as a smart camera (e.g. modified device 101), is the battery 215A. The power circuit of many smart phones 101A may be used to charge the battery 215A, and the battery 215A may then be used to power the phone 101A. Batteries 215A typically also have a limited amount of charge-cycles, where charge cycle means the battery 215A is charged and then drained. Overtime, the capacity of the battery 215A to provide power to the phone 101A diminishes. The voltage of the battery 215A may vary in different temperatures. The smart phone 101A batteries 215A can also have a protective circuits that automatically protect the battery 215A from over charging and under discharging at high or low temperatures (e.g. when sensed threshold temperature is reached) which can otherwise damage the battery 215A. The automatic disconnection of the battery 215A can be done by the device software and/or hardware by: (a) completely disconnecting/switching off the battery (and effectively powering off the phone); or (b) disconnecting/switching off the charging circuit of the battery. Importantly, the battery 215A is not one of the retained set of smart phone components in the modified device 101. The smart phone 101A parts can be attached to each other in various means, such as adhesives, screws, clips/pins, inserts, or compression.

In terms of modification of the smart phone 105A, while the smart phone 101A is open, other components or assemblies which are not relevant for the smart camera functions can be removed, i.e. considered non-retained smart phone components. For example, a wireless charging assembly, NFC assembly, or assembly with buttons which are not used can be physically removed from the device 101A. Some smart phones 101A can continue to operate after the removal of such components, while losing the function that the components provide.

Referring to FIGS. 3A-3B, a smart phone's 101A battery 215A is typically accessible by removing the back plate 202A. It may also require removal of a housing component/assembly 206A. The phone 101A hardware configuration may be different, and to illustrate this, two examples are provided, example 300Aa refers to a configuration where the smart phone 101A has a motherboard 203A and a daughter board 205A connected by a flex-cable interface connector 204A. Example 300Ab depicts a smart phone where there is only a large motherboard 203A. In most cases, due to the battery size, the electrical components will be arranged around (within the shell) the battery 215A to minimize the smart phone depth/thickness. The battery 215A can be attached to the front plate 201A or a midframe/assembly 207A in various ways, such as: by adhesive, in a mounting bracket, by tape, by compression. The battery 207A would then be removed in an appropriate means, in order to make the modified device 101 (see FIG. 4a). Some examples of means to remove 302A the battery 215A include prying it out with fingers or prying tool, heating up the adhesive, peeling tape, opening screws and mounting bracket, amongst others.

The battery 215A itself can include specialized connector circuit 305A, also referred to as a specialized circuit 305A. The battery 215A charging circuit, the specialized connector circuit 305A, or the battery 215A itself can include some or all of the following components: (a) fuses; (b) chips; (c) sensors; and (d) other electrical components. Other than providing a connection interface from the battery 215A to the motherboard 203A, the specialized circuit 305A can be responsible for protecting the battery 215A from overcharging, charging in the wrong temperatures, and/or from electrical situations which may damage the battery 215A. Some smart phones 101A monitor the presence of such circuits 305A and can have sensors/software to detect that the battery circuit 305A is present for the smart phone 101A to function properly. In such cases, the battery circuit 305A may be detached 304A from the battery 215A through mechanical means for use in the modified version of the smart phone 101A (modified device 101—see FIG. 4A).

Once the battery 215A is removed 302A from the smart phone 105A, as depicted in options 303Aa, 303Ab of FIG. 3, further methods take place to provide alternative means to power it up. The battery 215A itself can be discarded to improve the smart phone's 101A performance in a smart camera operating environment as the modified device 101, such as, advantageously reducing power draw, reducing heat, extending operating temperature, and extending service life, amongst other benefits.

Modified Device 101 Electrical

Figure 4B:
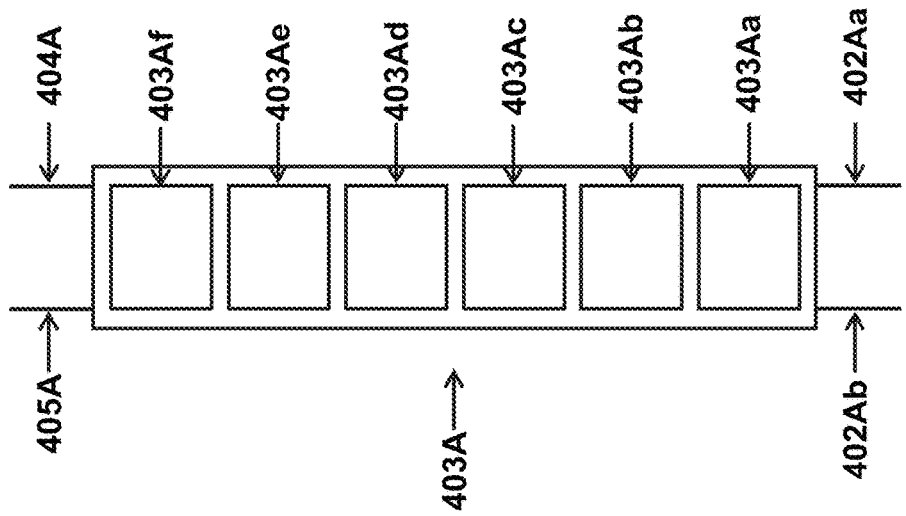
FIGS. 4A-4B depict an electrical modification to the smart of FIG. 1 for use without a battery as the modified device including a set of smart phone components.
Figure 4A:
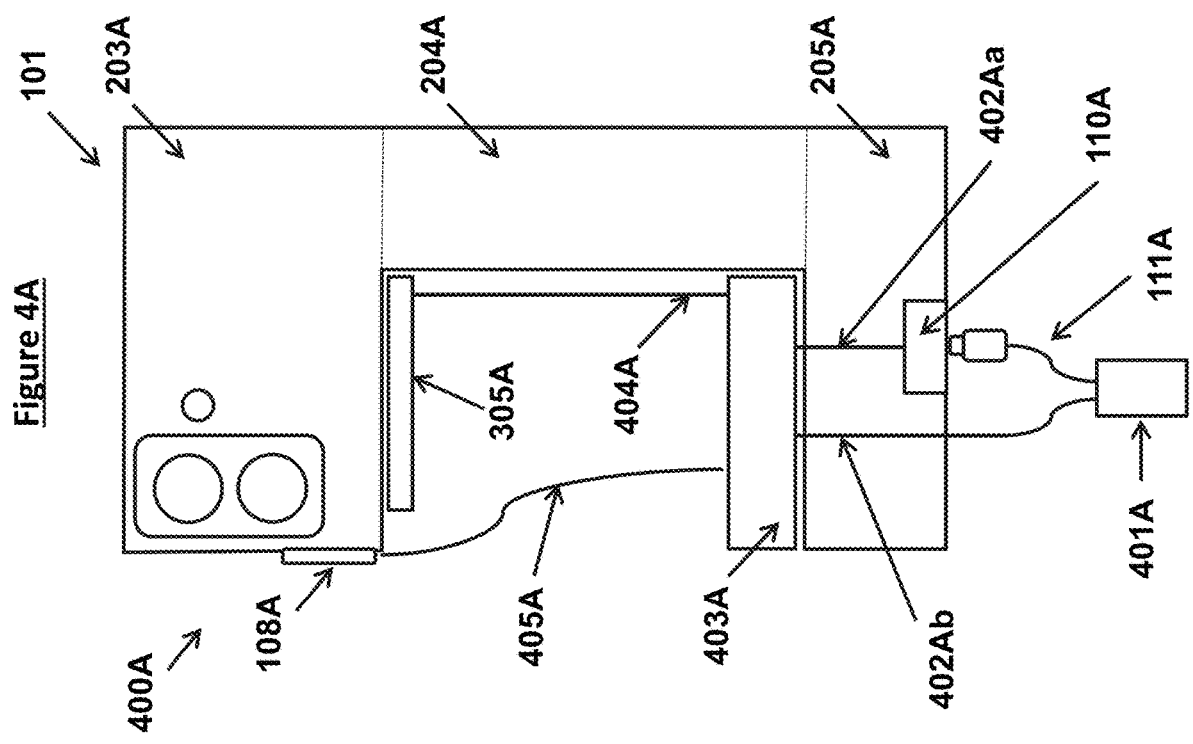

Referring to FIGS. 4A-4B, in relation to FIGS. 1,2, we describe methods and modifications 400A to power a smart phone motherboard 203A without the use of a battery 215A, thereby providing the modified device 101 having retained components of the set of smart phone components (e.g. motherboard 203A, cameras 105A,106A, display, antennas, network connection interfaces, etc.).

As the modified device 101 is meant to be deployed in an environment with constant power, there can be different power options depending on the type of the environment. By way of example, if the environment is a vehicle, then the vehicle may be a bus, truck, SUV, service vehicle, car, golf cart, an autonomous vehicle, or a robotic vehicle. While the power configurations can vary between vehicle to vehicle, or environment to environment there would typically be a power supply 401A which would provide power to the modified device 101 at a specific voltage. In a vehicle environment, it can be the vehicle auxiliary port, a USB port, power plug, or other interface that is meant to power a modified device 101. In another environment, it may be a USB port, or a cable connected to the power supply 401A of the vehicle that provides the appropriate voltage for the modified device 101.

Many electronics computing devices (including smart phones 101A—see FIGS. 1,2) can require a higher input current (over that of normal operational current) when powering on. This is typically called in-rush current, startup/switch-on current, or input surge current. When the battery 215A is present, the battery 215A can supply the in-rush current. However, without the presence of the battery 215A in the modified device 101, some retained smart phone circuitry could require that the power supply 401A also provide for enhanced current flow capabilities such as quick charge, which allow for a higher throughput of electrical current, facilitating the modified device 101 to boot successfully.

The charging port 110A on the smart phone 101A is typically present on the motherboard 203A or a specialized daughter board 205A connected by an interface 204A. For the purposes of describing the modifications, we will refer to the combination of motherboard 203A, and optional interface 204A and optional daughterboard 205A collectively as motherboard 203A as retained in the set of smart phone components.

The charging port 110A of the modified device 101 is connected to a power supply 401A or charger 401A through a connector cable 111A which can be embodied as a USB or lightning variation, but can also have other variations (it is likely that with time, the interfaces for charging cables 111A change with further innovations in power and interface cables).

For the purposes of using the modified device 101 (i.e. a smart phone 101A reconfigured to operate as a smart camera 101), the DC power pair 402Aa from the power socket 110A can be jumped (for example using soldering and electrically conductive cables 402Aa) onto an electrical connection circuit 403A (also referred to as custom power circuit 403A—see FIG. 4b, which is considered as an additional component to the retained set of smart phone components). The power supply 401A can also provide for a direct DC power pair 402Ab cable (also referred to as an electrical connection) which could be connected into the internal electrical connection circuit 403A. While the power circuit 403A in many cases could be placed internally to the modified device 101 to conserve space, in some variations it can be placed outside of the modified device's 101 shell 700A (see FIG. 7A-7C, for example).

The custom power circuit 403A would take as input power from the power supply 401A using direct power connections 402Ab or jumped power 402Aa through an existing power plug 110A. FIG. 4a shows each of these options, recognizing that either one or both of the options of connections 402Ab, 402Aa can be used in the modified device 101, as desired.

The custom electrical power circuit 403A (see FIG. 4B) can include one or more selected or all of the following additional components to that of the retained set of smart phone components:

(a) Electrical safety component(s) 403Aa such as a fuse that operates to provide overcurrent protection circuit for the circuit 403A. The fuse may be Positive Temperature Coefficient (PTC);

(b) Voltage regulation component(s) 403Ab, (for example, Transient Voltage Suppressor (TVS)) to inhibit from voltage fluctuations, and stabilize the input voltage when the input voltage raised above its safe operating voltage level to facilitate a safe booting (as the device 101A may be expecting a battery 215A within a certain voltage level). The voltage regulation component(s) 403Ab can be a clamping device that chants the excess current when it detects over voltages to protect the system circuits;

(c) Capacitance component(s) 403Ac such as an electrolytic capacitor and/or ultra capacitor, to store energy, to regulate output voltage, to filter the input or output transient voltage, and/or facilitate the modified device 101 to shut down appropriately when the power supply 401A is disconnected;

(d) Reverse current and reverse polarity protection component(s) 403Ad, such as a fast-switching diode;

(e) Temperature control circuit component(s) 403Ae, such as a thermostat, thermal fuse, or thermal switch, that facilitate the device 101 to only power on within a specified temperature range; and/or to shutdown the device 101 when it is at high temperature;

(f) Microcontroller circuit 403Af to send power (on or off) signal 405A to the device 101A based on availability of power 401A. The microcontroller can also be used for LED and fan control; and/or (g) Inductance circuit 403Ag components to limit in-rush current to protect the device 101A circuitry or regulate its current.

The specialized power circuit 403A components shown individually in FIG. 4B may be inter-connected through a printed circuit board, cables, heat shrink, soldering, surface mounting and/or other common methods of connecting components of an electrical circuit.

The specialized circuit 403A can be connected to the battery connector 305A component using a DC pair of wires 404A, or an extended printed circuit board (PCB) 404A. The connection to the power supply 401A to the motherboard 203A could be done directly (using a direct connection 404A—not shown) or through the battery connector 305A as shown by example. When powered, the specialized circuit 403A then provides the appropriate levels of voltage and current that meet the appropriate logic for the motherboard 203A now used by the modified device 101 to power on and boot the modified device 101.

Most smart phone 101A devices boot into an initial state in which the phone is locked and/or in a power-saving mode. Depending on the smart phone manufacturer, operating system, the application permission requirements and security settings, launching third party software (apps and/or services) can require the device to be activated or turned on by a user by pushing a button 108A, allowing the launch of the third party software (such as the app or service).

Accordingly, in the modified device 101, the power circuit 403A can have a single wire 405A or double wire cable 405A to connect directly to the power button 108A switch in order to simulate a user pushing the button and "turning on" the phone. The power-on wire 405A can replace the button contact, or be connected to the same electrical contact interface, through soldering (by way of example as to how it could connect). As such, it is recognised that the power-on connection 405A is used by the custom power circuit 403A to simulate the user pushing the button 108A and thus "turning on" the modified device 101. In other words, the power-on connection 404A coupled between the custom circuit 403A and the button 108A is used by the modified device 101 to bypass any need to manually push the button 108A in order to start the modified device 101, as further discussed below.

Example Operation of Modified Device 101

Figure 5:
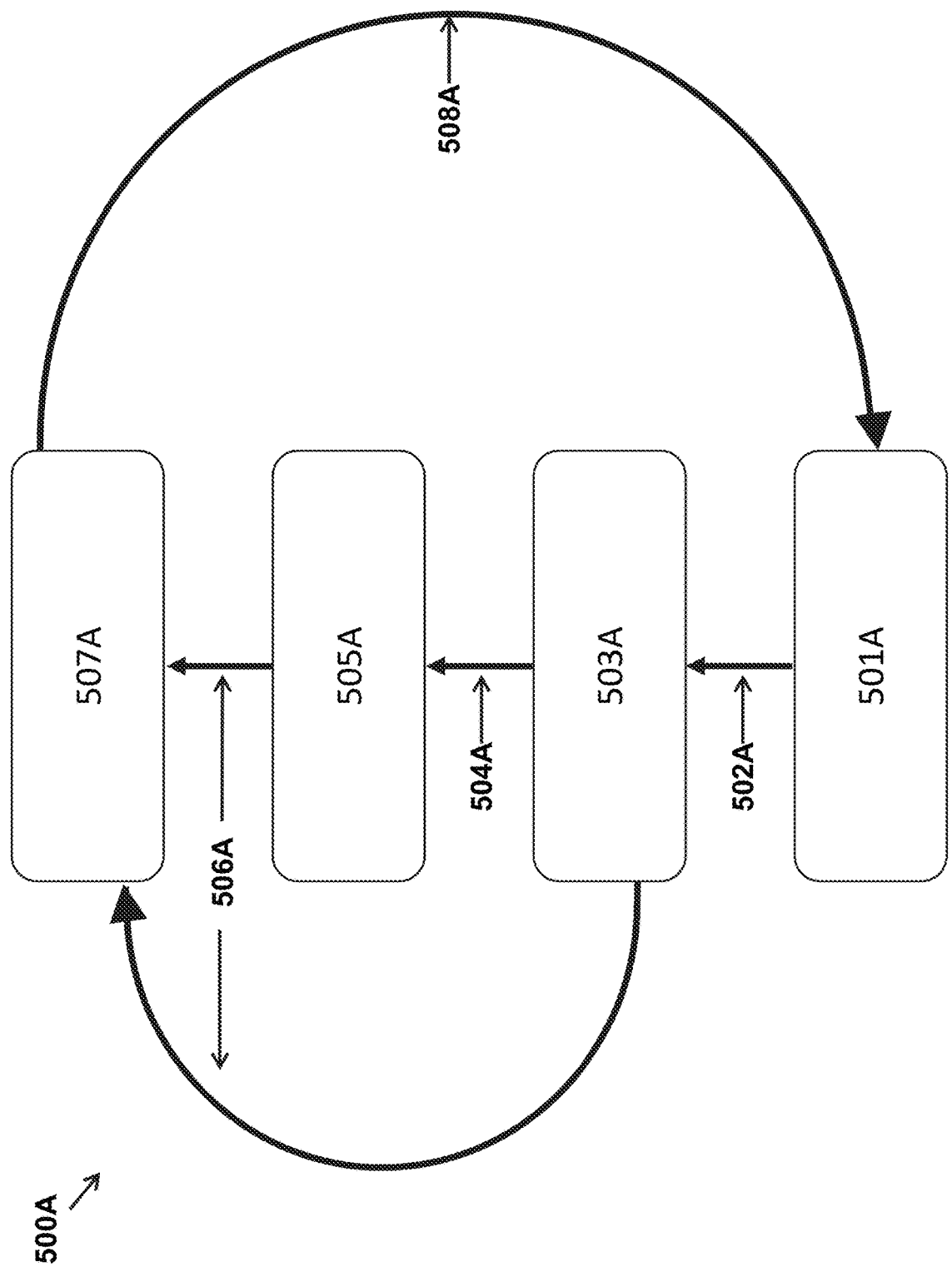
FIG. 5 depicts a sample software state diagram for automatically launching a smart camera application of the device of FIGS. 4A-4B.

Referring to FIG. 5, we depict a sample software state diagram 500A (for a smart camera application A, also referred to as an application A) stored on the memory 99 (see FIG. 9) of the modified device 101 that shows by way of example, different states that the modified device 101 system may have.

Starting from an initial state where the modified device 101 is powered off (for example, positioned adjacent to a windshield of a vehicle), the modified device 101 starts in a powered-off state 501A. When the modified device 101 is connected to a power source 502A, the special power circuit 403A provides the appropriate voltage and current, the modified device 101 motherboard 203A initiates a boot sequence whereas the modified device 101 state is then booted/running 503A using the application A. It is noted that the power automatically supplied via connector 405A by the special power circuit 403A directly to the button 108A simulates pressing of the button 108A.

In some cases, once the device 101 is booted 503A, the smart camera software A (resident in the memory 99 as a set of instructions for execution by the computer processor 120—see FIG. 9) can automatically launch 507A as a scheduled operating system (OS) task 506A or automated app launch 506A. The smart camera software A can launch 507A directly or through an intermediate software such as a Mobile Device Management (MDM) system stored in the memory 99. Some MDM platforms provide a function where the MDM software is launched 507A, and can then launch 507A other applications in automatically.

Some operating systems of a smart phone 101A, security permissions and mobile device manufacturers prevent access to the devices 101A camera(s) when the device 101A is in booted mode 503A, and the device 101A would have to be manually activated 504A by a user.

In order to compensate for the above prevented access in the modified device 101, power button press 504A could be simulated (as discussed above) by the specialized circuit 403A which then transitions the modified device 101 state to an activated/unlocked 505A state, for example via operation of the application A. From the open state 505A, the app/service A can then be launched 507A automatically in a direct manner 506A such as an OS task or an indirect manner 507A through another app (for example, through MDM software).

The modified device's 101 operating software A may also be switched, adapted, utilize custom settings, or be rooted in order to enable automated start features (503A, 504A, 505A, 506A, 507A or a combination thereof) in the operating system of the motherboard 203A or the application A. Rooting is a process where certain security features in an operating system are bypassed or disabled in order to more freely program the modified device 101 to undertake functions which would otherwise be prevented by the original smart phone device's 101A programming. It is recognised that the application A is additional to the retained set of smart phone components Referring again to FIG. 5, once the smart camera user software A of the modified device 101 is launched 507A, the app A can run indefinitely so long as the device 101 is programmed to do so (for example, by turning off screen saver or auto device lock features of the modified device 101 operating system features resident in the memory 99).

The modified device 101 can be shut off 508A in a variety of ways, including for example: (a) by disconnecting the modified device 101 from the power source 401A (for example, by turning off the vehicle); (b) by disconnecting the power cable 111A to connecting the device 101 to the power source 401A; (c) programmatically, by sensing a power-off request using a local input from a vehicle, power source, or a button; (d) by meeting a software condition in the modified device's 101 software A.

As such, the modified device's 101 software A can accommodate cooperation with a device operating system stored in the memory, such that rooting is employed and the device operating system is programmed to launch the application A automatically when the retained set of smart phone device components are booted, such that powering on the set of smart phone device components is performed by bypassing use of a power button of the retained set of smart phone device components.

Further, the custom power circuit 403A can reside outside of the housing 700A (see FIG. 7 by example), such that the custom power circuit 403A is external to the retained set of smart phone device components (of the smart phone 101A). For example, a fan can be powered and controlled by the custom power circuit 403A. For example, the application A can be launched automatically through an OS setting upon a device boot of the retained set of smart phone device components. For example, the application A is launched automatically when the modified device 101 is switched from a booted state to an unlocked state. For example, the application A is launched through a third party mobile device management application stored in the memory 99. For example, the custom power circuit 403A holds a charge for the retained set of smart phone device components to shut down without power interruption when an external power supply 401A is disconnected from the retained set of smart phone device components.

Referring to FIG. 6, we depict, by way of example, thermal and mechanical modifications 600A to a smart phone 101A (see FIGS. 1,2) which help the resulting modified device 101 to dissipate heat better (in view of the removal of the battery 215A and other desired operating conditions of the modified device 101 (e.g. onboard AI processing of the acquired images via the camera(s) 105A, 106A).

Modified Device 101 Heat Dissipation

Referring to FIGS. 6A-6B, the modified device 101 has a front plate 601A (which may include a screen and optional frames/assemblies) and a back plate 605A. There may be a mid-frame as well as discussed in FIG. 2. Since the battery 215A (see FIG. 3A) is typically accessed from the back, for the purposes of this diagram we will treat the front plate 601A as the component where the motherboard 203A is housed. The motherboard 203A may be a standalone motherboard 203A or several electronic printed circuit boards connected together.

Since the battery 215A would take up a large portion of the interior of the modified device 101, once it is removed 302A (see FIG. 3A) as part of the electrical modification 400A to the smart phone 101A, there is a portion of the interior 610A of the modified device 101 that is left vacant—see FIG. 6A. Since air is a poor thermal conductor, it is commonly referred to as a thermal insulator. As such, it is not favourable, from a heat management perspective, to keep a large portion of the interior 610A of the modified device 101 filled with air. Therefore, an embodiment of the invention replaces the battery 215A in the interior 610A with a thermally conductive material 602A (an additional component to that of the retained set of smart phone components) such as a metal or metal alloy (for example, copper plate or aluminum alloy) or a thick thermally conductive material such as a conductive pad, tape, adhesive, rubber, or composite material.

The filling material 602A would be tooled, cut and/or manufactured to have dimensions similar to the device's 101A battery 215A and can be attached to the interior 610A using compression, or using thermally conductive paste 604A or adhesive material 604A to fill air gaps between the interior 610A surface and the material 602A to increase heat transfer rate between the heat generating components of the modified device 101 and the conductive material 602A. On top of the filling material 602A, there can be another thin layer (for example, 1 mm) of thermally conductive material such as thermally conductive pad, tape or a thermally conductive metal or alloy 604A (assuming it would not short electrical components, otherwise, it would have to be not an electrically conductive) in order to maximize the thermally conductive surface area which is touching the smart phone's back plate 605A.

The modified device's 101 back plate 605A is typically the default plate with which the smart phone 101A is originally provided. For simplicity, in this figure, the back plate 605A is a comprehensive term which may include other assembly components 605A and mid-frame 605A components used for the modified device 101 to function.

The back 605A is typically smooth. A common principal in heat dissipation from an object temperature to ambient temperature, is increasing the contact surface area of the object to be cooled down with air using a highly thermally conductive material (such as aluminum alloy). As such, a thin two sided thermal tape 604A or thermal glue 604A may be used to attach a heat sink 606A to the back 605A of the modified device 101. The heatsink 606A can be made of a corrosion resistant material such as an aluminum alloy. The heatsink 606A can also be anodized. The back part 605A and front part 601A can then be re-attached using an adhesive (which may be thermally conductive), which can help to maintain the modified device's 101 resistance to water and dust ingress. The heat sink 606A can be attached to the exterior of the back plate 605A, however, it can also be mounted directly inside the interior 610A and slot through a pre-fabricated or cut-out opening in the back plate 605A, as desired.

Figure 7A:
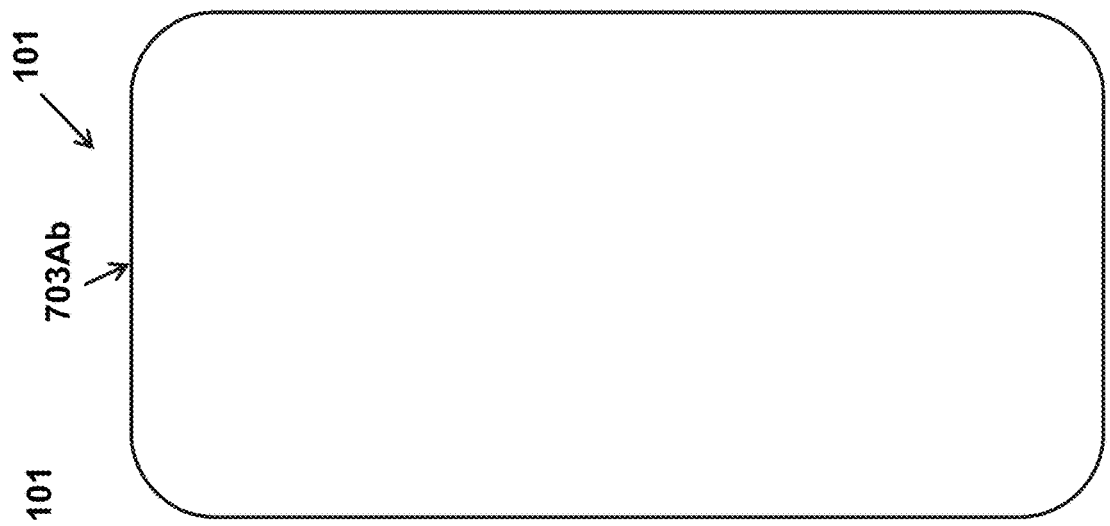
FIGS. 7A-7C depict front, side and back views of an enclosure for the device of FIGS. 6A-6B.
Figure 7B:
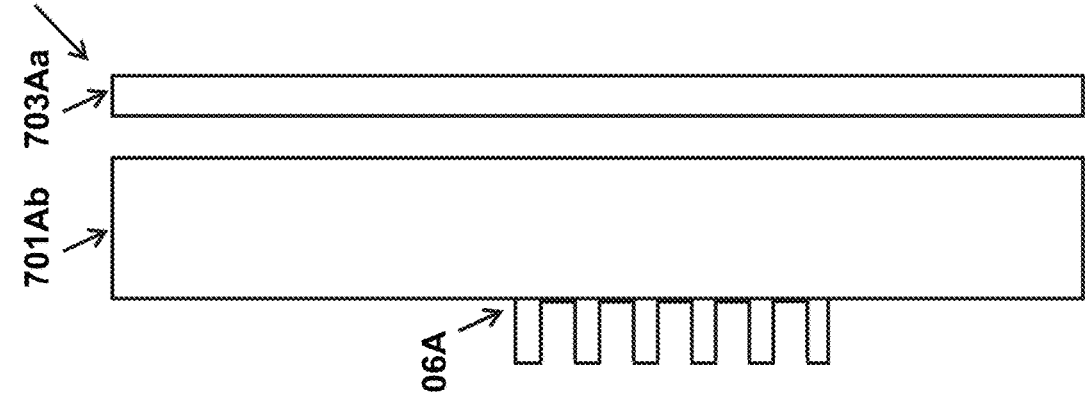
Figure 7C:
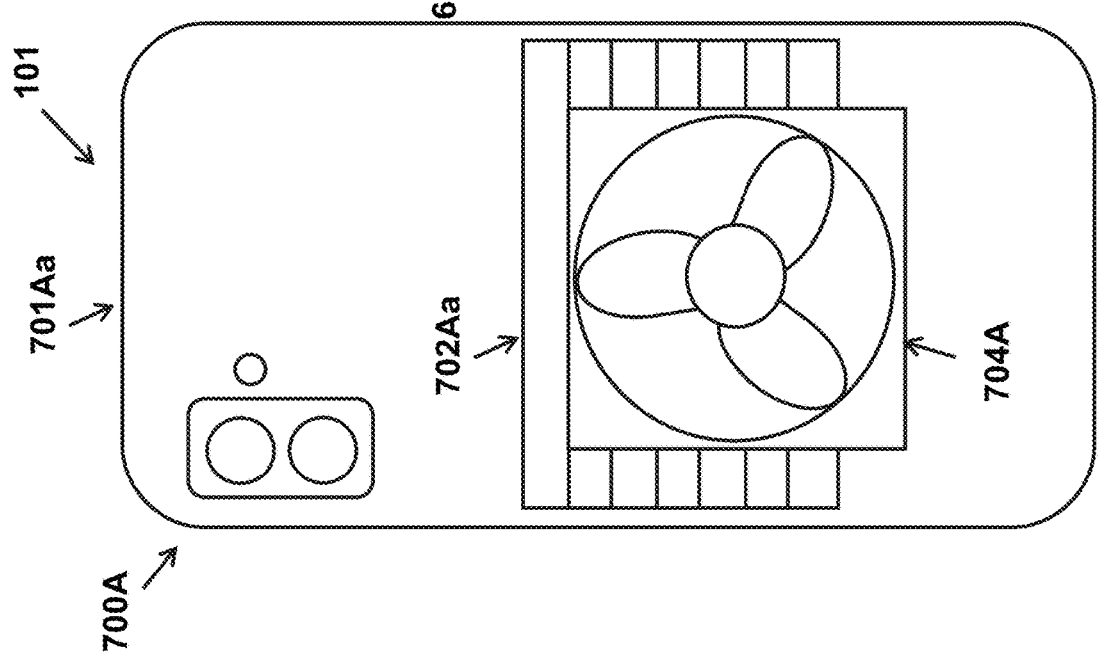

Referring to FIGS. 7A-7C, the electrically and mechanically modified device 101 can be further packaged in a custom enclosure 700A or rugged off the shelf smart phone case 700A in order to help and promote its use in industrial, outdoors or vehicle settings. For example, the modified device 101 can be moved from vehicle to vehicle when a vehicle is being serviced, or between vehicles in different shifts. A rugged case 700A therefore, would help in mitigate damage due to accidental drops, and exposure to dust and water. In the FIGS. 7A-7B, the modified device 101 is enclosed between a front cover 703Ab and a back cover 701Aa. The modified device 101 can be placed inside the case 700A. The case 700A or packaging can have a cut-out 702Aa to allow the heat sink 606A to transfer the internal heat to ambient temperature through contact with air in order to maintain heat dissipation. The FIG. 7A-7B also depicts an optional fan 704A, which may or may not be needed. The ambient temperature in most cars is less than 50 degrees Celsius when operated by a human being. In many cases, the vehicle may have air conditioning/climate control in place or have the windows open which help to provide a flow of colder air in the vehicle to provide temperature which is appropriate for a human. As such, in many instances, it is expected that the passive cooling (without the use of a fan 704A) could be sufficient for the modified device 101.

However in some cases where ambient temperatures are excessively hot and the modified device 101 is left in the vehicle for an extended period of time, passive cooling may be insufficient. In such cases, it can be useful to utilize the integrated fan 704A, embedded in the heat sink 606A or placed on top of it in order to blow ambient air on the heat sink 606A actively in order to accelerate the rate of heat dissipation. In the event that a fan 704A is used, it could be powered by the power supply directly 401A using a second power cable (not shown), or could tap into the device's custom power 403A circuit in order to power the fan 704A up. The fan 704A can also be temperature activated/deactivated based on an embedded temperature sensor 403Ae on the power circuit, and/or controlled by a microprocessor 403Af—see FIG. 4.

It may be, that the original smart phone's 101A back plate 605A can be switched all together with a custom back plate 605A which has superior thermal conductivity properties, such as integrated fins for passive cooling and/or fan. If using a custom back plate 605A, the design can be different such that the modified device 101 will no longer resemble the look of the original smart phone 101A. In such case, it may not be needed to utilize the enclosure 700A to resemble that of the original smart phone 101A.

Referring to FIG. 8, we have a use case for the utilization 800 of a modified device 101 mounted in a vehicle 102 using a mounting component 103. The modified device 101 can be attached 103 to the windshield or the body of the vehicle 102. It can be attached 103 to the vehicle 102 using a suction cup, screws, adhesive, clasp, magnet, or other mechanical docking or attachment system which would attach 103 the modified device 101 to the vehicle 102. The attachment mechanism 103 can be either easily removable, allowing the modified device 101 to be transferred between different vehicles 102 or not easily removable, making the modified device 101 use primarily dedicated to a specific vehicle 102. The modified device 101 can be attached 103 internally to the vehicle 102 or externally.

While the vehicle 102 is traveling on the road 104, the modified device 101 collects image 106 data and associated sensor (not shown) 107 data 17 (collectively, "Collected Data" 108). Collected data 108 can also include data derived from sensor 17 or image information 106 obtained through the use of software or artificial intelligence (further described in FIGS. 9, 10 and 11). The image data 106 represents data captured within the modified device's 101 camera field of view 105 (using the cameras 105A, 106A—see FIG. 1). The field of view can be external to the vehicle 105 or internal to the vehicle (not shown in figure). The image data 106 and other data 107 is saved as a data point 108 in the memory 99, which represents the data captured in a specific location at a specific point in time. As such, each Collected Data point 108 includes image(s) 106 and other data 107.

The modified device 101 includes one or more camera(s) 105A, 106A retained from the original smart phone 101A. It can have multiple cameras 105A, 106A with different focal lengths, sensors and functions. Some camera(s) 105A, 106A can be geared towards obtaining a wider field of view 105 whereas others may obtain narrower field of view 105. The camera(s) 105A, 106A can adjust the field of view 105 by using different lens, by using a mechanically adjustable lens, or by making digital adjustments to the image 106, such as cropping. As the modified device 101 is collecting data 108, it will include image(s) 106 from one or more of the modified device's 101 cameras 105A, 106A. The modified device 101 may collect data from multiple camera(s) 105A, 106A simultaneously. The camera(s) 105A, 106A can be internal or external to the modified device 101 and connected to it through a wired or wireless interface. The camera(s) 105A, 106A can capture the interior of the vehicle 102, the exterior of the vehicle 102, or both.

The modified device 101 will also typically be equipped with a GPS, GNSS, or other location based sensor 107 system which may rely on satellites, cellular towers, and/or internal position sensors in order to estimate the position of the modified device 101 using a coordinate system.

The modified device 101 will also typically be equipped with one or more network interface(s) which would allow the modified device 101 to communicate with other components, devices, computers and/or servers. The modified device's 101 network interface(s) may be internal or external wireless network communication module(s) which can facilitate it to send and receive 109 information over a wireless 110 and/or cellular network 110 and over the internet.

The modified device 101 can also collect other sensor 107 data 17 in addition to images 106. The modified device 101 can include sensors such as a gyroscope, rotational vector sensor, accelerometer, level/orientation sensors, vibration/roughness/bumpiness sensors, sand other sensors. The additional sensors may be internal to the modified device 101 or connected to it externally, through wired or wireless interface(s). The modified device 101 can also analyze the image(s) 106 through the use image processing, computer vision and/or artificially intelligent neural networks in order to label the images 106 or localize and label objects within the images 106. The modified device 101 can use multiple sources of data and/or temporal variations in data to derive new data (for example, which side of the road the vehicle is travelling on).

The modified device 101 can also conduct some or all of the following functions: video or image acquisition, decoding, encoding, processing, inference (using artificial intelligence), storage, and transmission. To support image or video based operations, the modified device 101 will typically include a Central Processing Unit (CPU) 120, Graphics Processing Unit (GPU) 121, or an integrated chipset/processor with equivalent functions. The unit can also have additional processing components specialized in video/image functions. The device 101 will also typically have working memory 99/volatile memory 99, such as Random Access Memory (RAM) in order for software to operate, see FIG. 9.

Example Platform of Modified Device 101

Referring to FIG. 9, the modified device 101 will typically store the collected data 108 locally on non-volatile local storage 99 (such as disk, hard drive, solid state memory, or other types of non-volatile memory) until such time that the device 101 is programmed to transmit 109 the data 108 to a server 111.

The modified device 101 consists of a plurality of hardware and software components that are configured to automatically collect visual, location and sensor data (e.g. images 106 and sensor information 17) while affixed to the vehicle 102 travelling along the road surface 14. Components that make up the modified device 101 are embedded in the computing system/infrastructure 700. FIG. 9 is for illustration only and it is recognized that a modified device 101 is composed of many components which vary between smart phone to smart phone and interact in different ways. We will describe some components which, from a functional perspective, may be utilized in the hybrid smart camera/smart phone function embodied as the modified device 101.

The modified device 101 is inclusive of a central processing unit (cpu) 120 and/or a graphics processing unit (gpu) 121. The two may be separate come as an integrated chipset. It would also include memory, such as non-volatile memory 99 (e.g. a high speed volatile memory such as a ram), which facilitates the modified device 101 to execute its software 708a (e.g. operating system, image processing instructions 905a, etc.).

The modified device 101 can also have non-volatile memory 122 that can be associated with storing files 706 associated with operating system(s), component driver(s), application(s), and media, alongside other software applications resident in memory 99 of the modified device 101. The device 101 operating system (e.g. part of the software 708a) can be such as a windows operating system, android operating system, linux operating system, or other operating system, whether embedded or not.

The modified device 101 (also referred to as a hybrid device 101) can also have a read only memory (not shown) for storing instructions necessary for operation of the modified device 101. The modified device 101 can also have one or more data transmitting and receiving components (communication components operating a network interface 113 to the network 110) which can be wireless. Further, the modified device 101 can interface with external wireless communication components 117 via wired connector 115, such as a usb connection, in order to transmit the data 108 over the network 110 to the server 111, as an example.

Further, the modified device 101 can have a user interface 119 including a display, built-in or external, in order to display information from the modified device 101, to an operator of the modified device 101, the display information such as but not limited to the camera 500 field of view (viewfinder), the orientation of the modified device 101, status indicators, settings, parameters, and other information related the installation, configuration operation, and maintenance of the modified device 101.

The modified device 101 can collect a variety of sensor data 107. In addition to camera(s) 500, the device 101 is equipped with a geo-positioning 701 sensor. The modified device 101 can also include an accelerometer 702 sensor, gyroscope 703 sensor, rotational vector 704 sensor, and other sensors 705 that can provide information 17 regarding the movement, position and/or orientation of the modified device 101 and/or the vehicle 102 on which it is equipped. The sensor(s) 107 and camera(s) 500 data 108 is processed by the software 708a (including the image processing instructions 905a) before being sent to the server 111, as discussed herein. The sensor data 17 and image data 107 may be stored on the modified device 101 non volatile memory 104 in the form of file(s) 706 or database 707 entries prior to being transmitted to the server 111.

The modified device 101 includes a geo-positioning sensor 701 to determine its geo-spatial coordinates 17. Geolocation, or a geo-positioning sensor 701, provide location based information 17 using satellite (such as GPS, GNSS, glonass, galileo) or cellular tower locations to determine device positioning information, which is associated with the images 106. In addition, the modified device 101 in many instances will have additional sensors 17. For example, modern smart phones 101A on the market today have a variety of sensors 107 embedded right onto them, which provide information 17 that can be used to determine the modified device 101 orientation, pitch, magnetic pole direction, geo-spatial position, velocity, acceleration, shock, vibration and other data 17 related to position and movement. The modified device 101 can include an accelerometer sensor 702 used to measure the acceleration force 17 applied to the modified device 101 across its x axis, y axis and z axis. The force may or may not include the force of gravity. The acceleration data 17 will typically be available as meters per second squared (m/s$^2$) though it may be in other units (for example voltage) that can be converted to such units. The modified device 101 can include a gyroscope sensor 703 used to measure the rate of rotation across the modified device's 101 x axis, y axis and z axis. The gyroscope data 17 will typically be available as radians per second (rad/s) though it may be in other units (for example voltage or frequency) that can be converted to such units. The modified device 101 can include a rotational vector 704 sensor used to measure the degree of rotation across the modified device's 101 x axis, y axis, z axis and an optional scalar product or quaternion. The rotational vector data 17 will typically be degrees, though it may be in other units (for example voltage) that can be converted to such units. The modified device 101 can include other sensor(s) 705 to measure a variety of other conditions 17 related to the movement, acceleration, forces applied and position of the modified device 101. For example, the modified device 101 can include a gravity sensor 700, which would measure the force of gravity 17 in relation to the modified device 101. Other sensor(s) 700 may also be magnetometer which can determine the modified device's 101 position 17 in relation to the magnetic north or true north. Other sensor(s) 705 may also include hardware and/or software monitoring of the modified device 101 components. Examples of sensors 107 can include battery level sensor, battery temperature sensor, cpu temperature sensor, gpu temperature sensor, ambient temperature sensor, cpu core utilization, cpu overall utilization, luminance sensor, proximity sensor, and other built in sensors available for the modified device 101. The modified device 101 may also be connected to other sensors through wired or wireless interfaces.

Any and all of the above discussed sensor type data (i.e. sensor data 17) can then be associated with camera(s) 500 images in order to determine additional insights. For example, the sensor data 17 may be used to derive ridership experience, level of vibration, the speed in which the vehicle 102 is travelling, whether the modified device 101 is within a geo-zone, or the estimated geo-positioning of an object detected in an image 106 in relation to the modified device 101. The sensor data 17 may also be used to optimize the performance of the modified device 101 in relation to the current heat, power and processing situation.

The sensor(s) 107 and camera(s) 500 provide for data 108 to be acquired and processed by the software 708a. The resultant processed data is then either transmitted to the server 111 or stored on the modified device 101 non volatile memory 104 until transmission can take place. The data 108 can be stored as file(s) 706 in variety of formats, such as xml, csv, txt, or in a proprietary format. The data 108 may also be stored in a database 707. The data 108 can be stored and transmitted in encrypted on non-encrypted format.

The data 108 can be further processed on the server 111 using the server's software 708b and image processing or AI capabilities 905b. For example, the data 108 may be correlated with road segments, assets, and other information to derive additional insights. The images may be further analyzed for objects of interest or redacted using server side AI processing 905b.

Modified Device 101 Application a Processing Features

Figure 10:
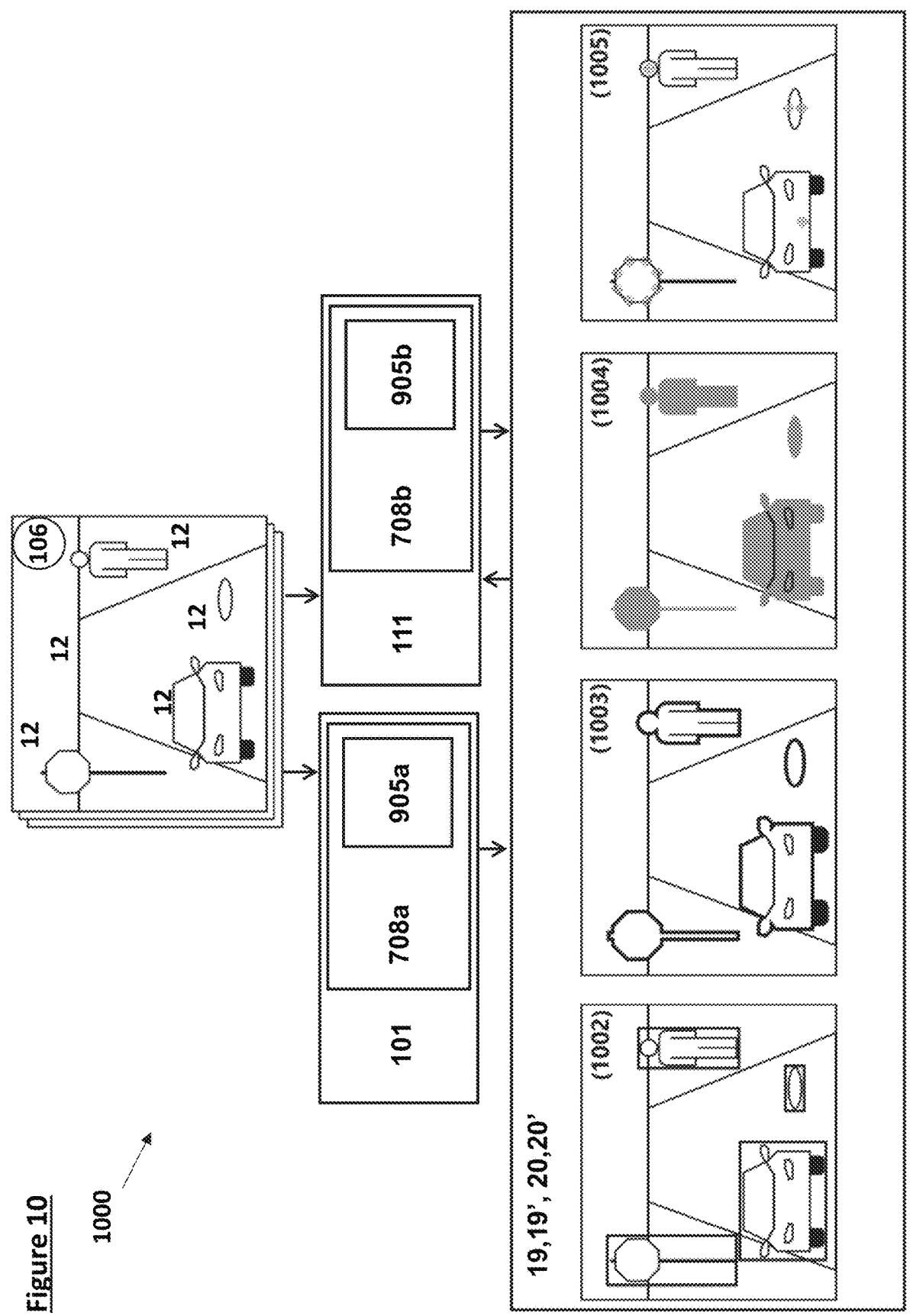
FIG. 10 depicts analysis of images using software and artificial intelligence and sample outputs of modified device of FIGS. 4A-4B.

Referring to FIGS. 10 and 11, the system 1000 can use artificial intelligence 905a,b on the software 708a,b on the server 111, the modified device 101 (including using the application A to perform some of the software 708a,b functions) or both. The system 1000 can execute the software 708a,b (including the artificial intelligence neural network(s) 905a,b) for AI analysis of image data 106, sensor data 17, or a combination thereof 108, including detection 902, 1002, classification 903, segmentation 904, 1004, polygon outline 1003, key-point 1005 identification, and other image processing operations 800 of image data 106 and objects of interest 12 in the acquired images 106 in order to infer (e.g. determine) what object(s) 12 are present in images 106, the position of the object 12 in the images 106 and/or other characteristics of the object 12 and/or image 106. As a result of the software 708a,b operations and image operations 905a,b, resultant image data 19,19' and AI data 20,20' can be generated.

Referring to FIG. 11, shown is an example of image processing system 900 implemented by the software 708a,b as part of or external to the application A (including the image processing instructions 905) on the acquired images 106, in order to produce the processed image data 20 to be included with the AI data 108 transmitted to the server 111. It is also recognized that the example of image processing system 900 implemented by the software 708a,b (including the image processing instructions 905) on the resultant image data 20, in order to produce the processed image data 20' to be included with the received sensor information 17 stored in the storage by the server 111.

The software 708a,b can include image instructions 905 (e.g. including artificial intelligence neural networks 905), for image 106 processing and inference for flexible workflows 906 inclusive of neural network(s) 905 inference operations 907 including detection 902, classification 903, segmentation 904, and other AI operations 800 in order to generate the discard data 19, 19' as well as the resultant processed image data 20, 20'. It is recognized that the workflows 906 can include a plurality of different numbers/combinations of the operations 907 in any order, as configured in the image processing instructions 905, in order to identify, classify, segment or run AI analysis on any of the image(s) 106 under consideration. Other image processing operations can include cropping, color space conversation, resizing, or other AI functions (for example, key point/landmark identification). One image 106 may have several different workflows 906 applied to it. The object(s) 12 of interest are also referred to as classes 12. The class 12 refers to one of the output categories for the object(s) 12 of interest. For example, they may include but are not limited to: pothole 12, car 12, person 12, sign 12, etc. The network(s) 905 can detect, classify, and/or segment one or more classes 12 (also referred to as object(s) 12 of interest) in the image 106. It is recognized that other supplementary functions may take place in the encompassing software 708a,b, for example object tracking or analysis of sensor 17 data in conjunction with the image processioning 800 functions.

It is recognized that the identified object(s) 12 of interest are included in the processed image data 20 while discard data 19 (for example, objects containing personally identifying information for redaction or blurring) is excluded from the processed image data 20, as one embodiment, such that the processed image data 20 and the sensor data 17 is transmitted to the server 111 as object data 21.

Further, it is recognized that the identified object(s) 12 of interest are included in the processed image data 20' while the discard data 19' is excluded from the processed image data 20', as one embodiment as implemented by the server 111 using the object data 21 obtained from the device 101.

Further, it is recognized that the identified object(s) 12 of interest and discard data 19 are included in unprocessed images 106 sent to the server 111 by the modified device 101 as the object data 21 (including the sensor data 17). Once received, then the server 111 would then process the images 106 as processed image data 20 while the discard data 19 is excluded from the processed image data 20, as one embodiment as implemented by the server 107 using the object data 21 obtained from the modified device 101.

Typically, image(s) 16 acquired by the modified device's 101 camera(s) 500 are available in some initial resolution, color space, and formatting. It is expected that in many cases, the image(s) 16 may need to undergo image processing 800 operations to optimize their compatibility with the neural networks 905 used and the object(s) 12 of interest which they are trained to identify. Some examples of image processing 800 operations are resizing or adjusting resolution, field of view adjustments, cropping, and/or color space conversion. Other image processing 800 operations can include artificial intelligence functions 800 such as keypoint/landmark detection, polygon detection, and other neural networks that extract information 20 from images 106.

As such, the image processing 800 operations can include the resolution of the image 16 can be set based on the available resolutions present on the camera 500 device, whether available as resolutions or as a name representative of the resolution. Further, the field of view can be adjusted via adjusting the optical zoom levels of the camera(s) 500. Further, the field of view can be adjusted by a digital zoom process, wherein the picture 106 is magnified and only the parts of the image 106 that remain within the original dimensions are processed. Further, the region of interest 12 in the image 16 can be set. Once set, the region of interest 12 will be cropped. Further, the image processing can include color space conversion, whether from one space to another, or adjusting the formatting, order and/or channels of the utilized color space.

For example, the processing instructions 905 (e.g. neural network 905a,b) can be defined as a set of functions, operations and/or instructions which facilitates for the system 900 to train itself (not shown) based on annotated datasets, commonly referred to as "ground truth". Once trained, the system 900 can then infer on new datasets. The process is known as machine learning. The neural network(s) 905 utilized in the system 900 can be primarily geared towards inferring images 106 and deriving new information 21, 21' (for example, identifying object(s) 12 of interest in images 106 for automated incident identification and reporting). Once processed using the image processing instructions 905. Further, software 708a,b is configured to construct the object data 21 by associating the sensor information 17 (e.g. including geo coordinate data) for each of the images 106 and/or objects 12 of interest. It is recognised that during the processing of the images 106 using the image processing instructions 905, some of the image 106 data acquired will be discarded in view of the discarded image 106 data may not be required by the software 708a, or may be redacted. It is recognized that discarded image 106 data can be referred to as discarded data 19 such that discarded data 19 is not included in the object data 21 and is thus can be inhibited from being transmitted over the network 110 to the server 111.

The neural network(s) 905 utilized can have a plurality of architectures which pass the image 106 through a sequence of layers operations (not shown) which are aimed at aggregating, generalizing, manipulating and/or modifying the information of another layer for the purpose of inferring, detecting, classifying and/or segmenting objects 12 in images 16. Examples of some typical operations in neural network(s) 905 are: (a) convolution; (b) rectification; (c) fully connected; (d) pooling layer (e) bottleneck and/or (f) loss layer.

The architecture of the system 900 can be a neural network 905 architecture such as: (a) single shot detector (ssd), (b) you only look once (yolo), (c) convolutional neural network (cnn), (d) region-based convolutional neural network (rcnn), (e) fast region-based convolutional neural network (fast rcnn), (d) faster region-based convolutional neural network (faster rcnn), (e), mask region-based convolutional neural network (mask-rcnn), (f) region-based fully convolutional networks (r-fcn), or other published neural network 905 architectures.

When a neural network 905 is trained on an image set, it can set certain parameters commonly known as weights. The parameters, or weights, are typically stored in a model file, or weights file. The neural network 905 utilized in the system 900 can be trained using published, well known, weights files as the basis. For example, mobilenet (such as mobilenetv1, mobilenetv2, mobilenet v3), inception (such as inception v1, inception v2, inception v3), vgg, or other popular pre-trained networks, and can be composed of different number of layers (for example, resnet50, resnet101). However, the concept of such pre-trained neural networks 905 is the same whereas a base architecture with base weights is modified whereby one or more of the last or final layers is modified to detect or classify a set of objects 12 of interest, which may be identical, exclusive, partially inclusive, or fully inclusive of the original trained objects and may include new objects not present in the original neural network 905. Neural network(s) 905 may also be of a proprietary custom architecture with weights or parameters which are trained from scratch.

The neural network(s) 905 may be utilized as a detector 902. A detector 902 typically identifies an object 12 of interest in image(s) 106, and the location of the object 12. The location of the object 12 is typically in the form of a bounding box represented by coordinate(s) and/or distance(s) in relation to a point of reference 902 in the image 16. A detector 902 may also provide a score, typically known as confidence, which represents how sure the neural network 905 is in the object 12 detection. A detector 902 may also detect landmarks. Landmarks are points of reference in a known object 12. For example, in the context of a detector identifying a sign, the bottom of the sign pole and the top of the sign pole may be landmarks. Such landmarks can then be analyzed to derive further information about the status of a sign—for example, whether it is crooked or not.

The neural network(s) 905 can be utilized as a classifier 903. A classifier 903 has a list of potential classes, or object types, which it is trained to identify in a picture. When processing image(s) 106, a classifier 903 typically returns a list of potential object(s) 12 in the image 106, sorted by the model's confidence of their presence in the image 16. The neural network(s) 905 can be utilized as a segmentor 904. A segmentor 904 typically segments image(s) 106 into regions. The regions are then typically predicted to belong to a certain class 12, or type, which allows to extract a mask, or a pixel blob, that represents the class 12. A segmentor 904 can also separate instances of the object(s) 12 into separate object(s) 12 representing one or more classes 12. For example, a segmentor 904 may identify a pothole 12, and also the shape of the pothole 12, which will allow to estimate its surface area and severity.

The neural network(s) 905a,b can be designed and/or optimized to be used on the device's 101/server's 111 gpu, cpu or both. The workflows 906 may utilize one or more neural network(s) 905, and the neural network(s) 905 may be used in a sequence. One neural network(s) 905 can responsible for detecting 902 objects and/or regions of interest in the image(s) 106, and one or more additional neural network(s) 905 can be responsible for classifying 903 the objects 12 and/or regions of interest already detected in the image(s) 16. For example, a neural network 905 may detect 902 a pavement crack 12, crop it with image processing 800, and then another neural network 905 classifies 903 it as a longitudinal type of crack 12. It could also be used to verify that the first detection is correct. For example, the first neural network 905 may detect 902 a pothole 12, crop it using image processing 800, and pass it to a classifier 903 which confirms it is a pothole 12 and not a manhole. In some situations, this process provides the opportunity to classify 903 the object 12 of interest using a higher resolution, since the detector 902 may infer on a scaled down version of the image 106, whereas the cropped image 106 would be inferred at a higher resolution.

One neural network 905 can be responsible for detecting 902 objects 12 and/or regions 12 of interest in the image(s) 106, and one or more additional neural network(s) 905 is responsible for detecting 902 additional objects 12 and/or regions 12 of interest in the already detected area(s) of the image 16. For example, a neural network 905 detects a car 12 and then another neural network 905 detects a license plate 12 on the cars 12. One neural network 905 can be responsible for detecting 902 objects 12 and/or regions 12 of interest in the image(s) 106, and one or more additional neural network(s) 905 can be responsible for extracting landmarks 902 from the objects 12 and/or regions 12 of interest in the image 16. For example, a neural network 905 detects a pothole 12, and then another neural network 905 will identify its topmost point, bottom-most point, leftmost point, and rightmost point, and return those in a coordinate format respective to the image 106, or in a coordinate format respective to the object/region 12 of interest.

Further, the neural network inference can be processed on the modified Device 101/server 111 GPU or CPU. The neural network 905 can infer multiple classes 12 simultaneously. Further, one or more of the neural networks 905 can be simplified by approximating the neural network to floating-point numbers for the purpose of reducing the memory and processing requirements. Such reduced neural networks, sometimes known as Quantized neural networks, are then used on the Device 101 CPU.

We claim:

1. A modified smart phone device as an automated system for collecting digital images in an automated manner of an environment external to a vehicle in motion, the system comprising:
   a housing having an interior and an exterior for mounting to the vehicle;
   a set of smart phone device components in the interior of the housing including a smart phone memory, a smart phone computer processor for executing a set of instructions stored on the smart phone memory and a battery compartment adapted for holding a battery, such that the battery compartment is internal to the housing;
   a newly provided space holding a thermally conductive material to displace at least some air from the newly provided space for promoting heat dissipation;
   a camera controlled by the computer processor, the camera for use in said collecting digital images;
   an application as part of the set of instructions stored in the smart phone memory, the application when executed by the smart phone computer processor implementing said automated collecting digital images of the surrounding environment and subsequent processing of the digital images; and
   an alternative circuitry in substitution of the battery such that the battery is absent from the set of smart phone device components, the alternative circuitry is installed in the battery compartment to supply operating power to the smart phone computer processor and the camera.

2. The modified smart phone device of claim 1, where the processing includes using computer vision and artificial intelligence.

3. The modified smart phone device of claim 1, wherein the application analyzes the digital images captured the camera using artificial intelligence and generates digital data for sending to a remote server when connectivity allows.

4. The modified smart phone device of claim 1, wherein the battery of the set of smart phone device components is absent from an interior of the housing thereby creating newly provided space, which was not present before removal of the battery of the smart phone device.

5. The modified smart phone device of claim 4, wherein the alternative circuitry as a custom power circuit holds a charge for the set of smart phone device components to shut down without power interruption when an external power supply is disconnected from the set of smart phone device components.

6. The modified smark phone device of claim 4 further comprising the alternative circuitry as a custom power circuit in the housing, the custom power circuit replacing the battery of the smart phone device by connecting at least some of the set of smart phone device components to a power supply positioned external to the housing.

7. The modified smart phone device of claim 6 wherein the custom power circuit as a smart phone battery replacement circuit includes one or more component(s) selected from the group consisting of: (a) an electrical safety component; (b) a voltage regulation component; (c) a capacitance component; (d) a reverse current protection component; (e) a temperature sensor; (f) a microcontroller; and (g) an inductance component.

8. The modified smart phone device of claim 6, further comprising the custom power circuit electrically connected to a power button of the set of smart phone device components, such that an electrical signal from the custom power circuit simulates a smart phone power button activation action.

9. The modified smart phone device of claim 6 further comprising a layer of thermally conductive material laid internally within the housing between a back plate of the housing and housed components of the set of smart phone device components.

10. The modified smart phone device of claim 9 further comprising a heat sink coupled to the housing.

11. The modified smart phone device of claim 10, wherein the set of smart phone device components are encompassed in the housing acting as an enclosure or case with accommodation for the heat sink.

12. The modified smart phone device of claim 10, wherein the heat sink is attached to a fan unit for facilitating active cooling of at least some of the set of smart phone device components.

13. The modified smart phone device of claim 9, wherein the back plate is a custom back plate with a built-in heat dissipating configuration and materials.

14. The modified smart phone device of claim 6, wherein the custom power circuit resides outside of the housing, such that the custom power circuit is external to the set of smart phone device components.

15. The modified smart phone device of claim 6, wherein a fan is powered and controlled by the custom power circuit.

16. The modified smart phone device of claim 1, wherein a device operating system stored in the memory is a modified operating system and the device operating system is programmed to launch the application automatically when the set of smart phone device components are booted, such that powering on the set of smart phone device components is performed by bypassing use of a power button of the set of smart phone device components.

17. The modified smart phone device of claim 1, wherein the application is launched automatically through an OS setting upon a device boot of the set of smart phone device components.

18. The modified smart phone device of claim 1, wherein the application is launched automatically when the modified device is switched from a booted state to an unlocked state.

19. The modified smart phone device of claim 1, wherein the application is launched through a third party mobile device management application.

\* \* \* \* \*